US011619512B1

(12) United States Patent
Gupta et al.

(10) Patent No.: US 11,619,512 B1
(45) Date of Patent: Apr. 4, 2023

(54) DEVICE FOR PRESENTING AUGMENTED DELIVERY ROUTES

(71) Applicant: Amazon Technologies, Inc., Seattle, WA (US)

(72) Inventors: Anuj Gupta, Sacramento, CA (US); Avishek Chandra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/184,868

(22) Filed: Feb. 25, 2021

(51) Int. Cl.
*G01C 21/36* (2006.01)
*G06F 3/14* (2006.01)
*G06T 11/00* (2006.01)

(52) U.S. Cl.
CPC ............. *G01C 21/367* (2013.01); *G06F 3/14* (2013.01); *G06T 11/001* (2013.01)

(58) Field of Classification Search
CPC ........ G06T 11/001; G01C 21/367; G06F 3/14
See application file for complete search history.

(56) References Cited

U.S. PATENT DOCUMENTS

| | | | |
|---|---|---|---|
| 2020/0380467 A1* | 12/2020 | Chen | B32B 21/10 |
| 2021/0035064 A1* | 2/2021 | Nishikawa | G06Q 10/0833 |
| 2021/0182787 A1* | 6/2021 | Mouli | H04W 4/024 |

\* cited by examiner

*Primary Examiner* — Jacinta M Crawford
*Assistant Examiner* — Andrew Shin
(74) *Attorney, Agent, or Firm* — Lee & Hayes, P.C.

(57) ABSTRACT

A device may receive data associated with a delivery and display a first portion of a route associated with the delivery and first image data of an environment along the first portion. The device may determine that the first portion has been completed and may then display a second portion of the route. During display of the second portion, second image data representing a delivery location associated with the delivery may be presented. The first portion and the second portion may represent portions of the delivery that are completed using different modes of travel.

20 Claims, 13 Drawing Sheets

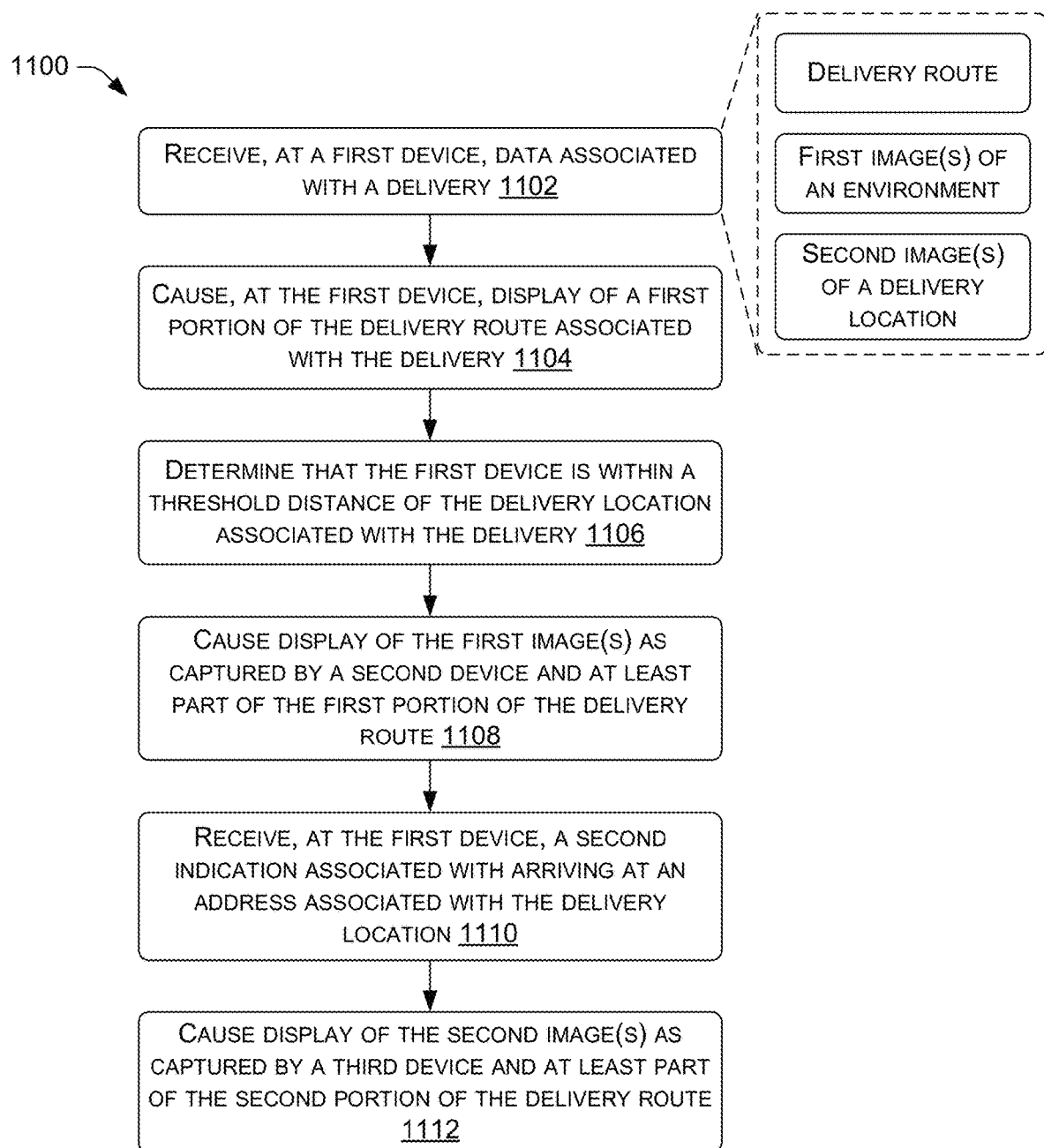

DEVICE FOR PRESENTING AUGMENTED DELIVERY ROUTES

BACKGROUND

The increase in online retail, or ecommerce, has led to an increase in shipments and deliveries. While online or mobile purchasing is convenient for consumers, logistical challenges are often introduced. For example, delivery locations may be difficult to find. This may result in delays, tickets, dangerous driving scenarios, and/or stress among delivery personnel.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 11 illustrates an example process for augmenting a delivery route, according to an embodiment of the present disclosure.

DETAILED DESCRIPTION

Figure 1:
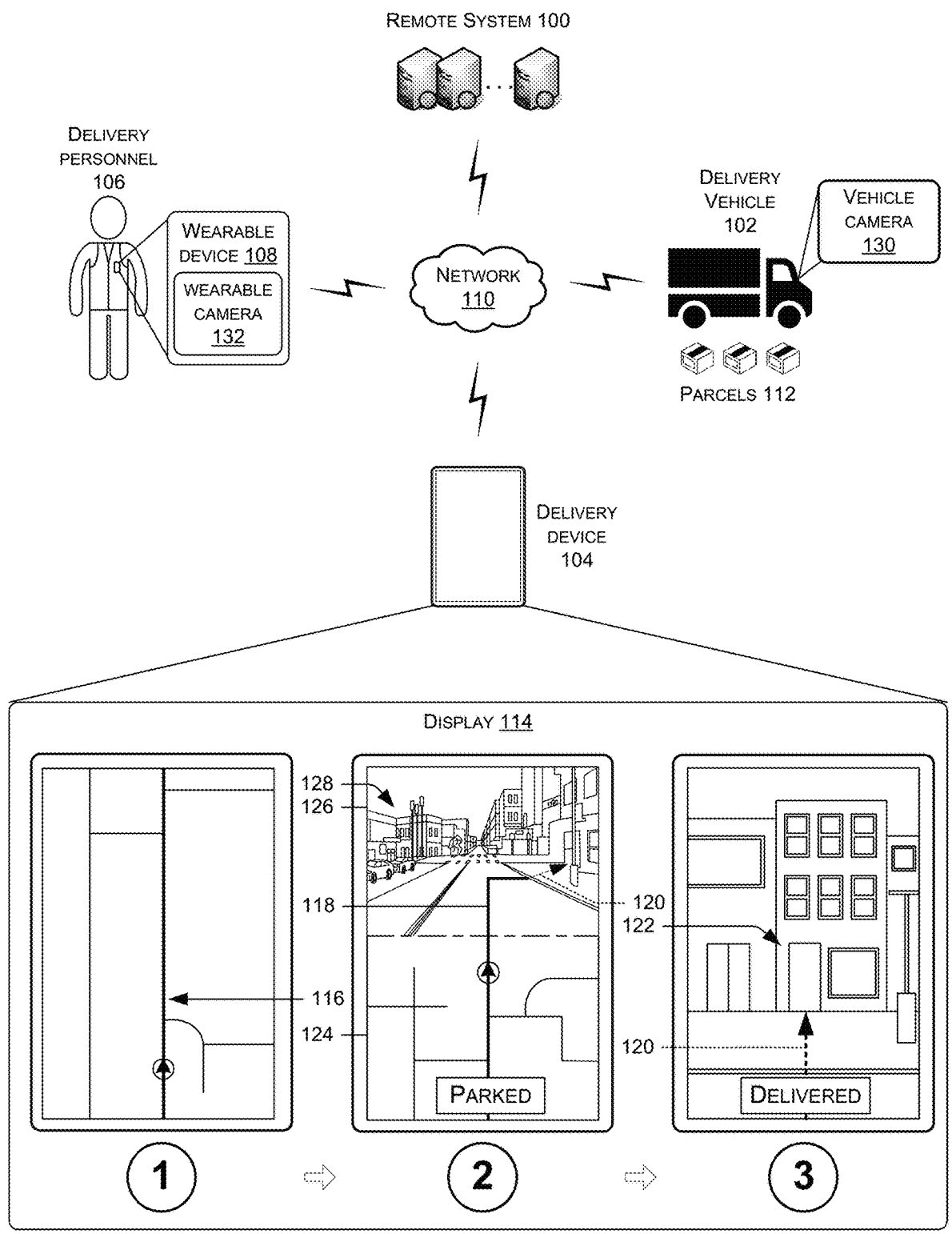
FIG. 1 illustrates an example environment for augmenting delivery routes to increase efficiency of deliveries, according to an embodiment of the present disclosure. In some instances, a remote system may communicatively couple to a delivery vehicle, a delivery device utilized by a delivery personnel, and/or a wearable device worn by the delivery personnel. The delivery device may iteratively present different portions of the delivery route to delivery personnel, along with image(s) of the delivery route.

This application describes, in part, systems and methods for augmenting delivery routes for use in efficiently making deliveries. In some instances, the systems and methods may receive an indication associated with a delivery to a delivery location and determine a delivery route for fulfilling the delivery. The delivery route may include multiple portions, such as a first portion and a second portion. In some instances, the first portion may be associated with a driving portion of the delivery route and the second portion may be associated with a walking portion of the delivery route. As a delivery personnel travels along the delivery route, whether the first portion or the second portion, images may be displayed on a device utilized by the delivery personnel. For example, as the delivery personnel travels along the first portion of the delivery route image(s) of an environment along the first portion of the route may be displayed. The device may display the image(s) of the environment as a way to augment the environment with the first portion of the delivery route. Additionally, upon parking at a location associated with the delivery location (e.g., on a street), the device may display an image of the delivery location as a way to augment the delivery location with the second portion of the delivery route. Upon delivery, the systems and method may determine updated delivery routes for increasing delivery throughput. Augmenting the delivery route may permit the delivery personnel to easily locate the delivery location and make deliveries.

In some instances, a remote system may determine the delivery routes, itineraries, or delivery schedules associated with the deliveries. The remote system may continuously receive indications of deliveries to be made and assign the deliveries to a plurality of delivery personnel (e.g., drivers, couriers, etc.). In some instances, the deliveries may be associated with delivering parcels (e.g., letters, envelopes, packages, etc.), food (e.g., take out), goods (e.g., flowers), and/or offered services (e.g., cleaning, maintenance, ride sharing, etc.). In such instances, as part of making a delivery the delivery personnel may be instructed to make the deliveries at a delivery location. In some instances, the delivery location may correspond to a location at which the delivery personnel makes a delivery, such as an address, place of business, receiving bay, lobby, front door, etc. In some instances, the delivery personnel may be instructed as to a particular delivery location at the address (e.g., front door, side door, etc.). More generally, however, the delivery personnel may be instructed to travel to a certain location for completing deliveries or offering services.

In some instances, the remote system may determine the delivery route through accessing mapping applications, third-party services, historical data associated with deliveries, etc. The remote system may also utilize a database to determine a geographical location or other source identifier(s) that correspond to a destination associated with the delivery route. For example, the database may store indications of building identifiers, geolocations, global positioning satellite (GPS) coordinates, etc. of the delivery locations.

In some instances, the delivery route may include multiple portions (e.g., sections, legs, etc.) along which the delivery personnel travels. The different portions may be associated with different modes of transportation (e.g., drive, walk, boat, etc.) or different methods by which the delivery personnel is to travel for making the delivery (e.g., driving, walking, elevator, stairs, etc.). For example, the delivery route may include a portion along which the delivery personnel is to drive (e.g., using a delivery vehicle) and a portion along which the delivery personnel is to walk (e.g., after parking the delivery vehicle). The remote system may determine, based on the delivery route, which portions of the delivery route the delivery personnel is to drive and walk, respectively. Mapping applications may also indicate which parts of the delivery route are capable of being driven and walked, respectively. The delivery route may also include instructions for prompting the delivery personnel as to associated maneuvers (e.g., turn right, turn left, etc.), where to park the delivery vehicle, and so forth.

The delivery route, instructions associated with the delivery route, and/or information associated with the delivery may be transmitted from the remote system to a device utilized by the delivery personnel. The device may be representative of any kind of device, such as a tablet, phone, personal assistance, wearable glasses, and so forth. The device is configured to display the delivery route, instructions associated with the delivery route, and/or information associated with the delivery. For example, the device may display an order in which to make deliveries (i.e., which delivery is to be made first, second, and so forth). Along the delivery route, the delivery personnel may stop at designated stop locations to make respective deliveries to delivery locations.

Using the delivery location (e.g., address), the remote system may also determine one or more locations along the delivery route associated with augmenting the delivery route. In some instances, the locations may be associated with a geographical location (e.g., geolocation), a geographical fence around the delivery location (e.g., geofence), a proximity to the delivery location (e.g., time-based or distance-based), or a threshold within the delivery location (e.g., time-based or distance-based). These locations may be associated with geographical triggers for augmenting the delivery route. For example, the location may represent a position along the delivery route that is a threshold distance (e.g., one hundred feet) from the delivery location. As the delivery personnel drives within one hundred feet of the delivery location, or as the geographical trigger is crossed, the device may display image(s) of the environment in conjunction with the delivery route. For example, the device may display image data depicting the delivery route and the environment in which the delivery personnel 106 is to travel. In some instances, the delivery route may be superimposed on the image(s) of the environment.

Additionally, or alternatively, the device may display the first portion and the second portion of the delivery route along with the image(s) of the environment. In some instances, the first portion and the second portion may be indicated using respective identifiers (e.g., different colored lines, different line types, different arrows, etc.). This allows the delivery personnel to visually see which portions of the delivery route are to be driven and which portions of the delivery route are to be walked, for instance.

In some instances, the image(s) of the environment may be received from the remote system and may be previously captured via the device or a delivery vehicle camera (e.g., dashboard camera). For example, the delivery vehicle camera may be forward facing, relative to a direction of travel, for capturing image(s) in front of and/or to the sides of the delivery vehicle. In some instances, the images of the environment may represent a street view of the delivery vehicle. As the delivery personnel travels along the delivery route, the delivery vehicle camera may continuously capture image data. This image data may be transmitted to the remote service according to predetermined schedules (e.g., every minute, hour, etc.), after the delivery has been made, or at certain periods (e.g., end of shift). The image data captured by the delivery vehicle camera may be used for display during subsequent deliveries to the delivery location (or other delivery locations). For example, the image data captured by the delivery vehicle camera may be stored in association with location data. If subsequent deliveries are scheduled to the delivery location (or other delivery locations), the remote system may use the location data associated with the previously captured image data for determining whether to use that image data for augmenting the delivery route. Initially, however, the image data displayed on the device represents image(s) previously captured by the delivery vehicle camera. During a determination of the delivery route, the remote system may determine the image data for augmenting display. That is, after determining the delivery route, the remote system may determine corresponding image(s) of the environment along the delivery route for display on the device.

In some instances, the remote system may transmit multiple image(s) of the environment to the device and the device may determine which image(s) of the environment to display based on a bearing and/or a location of the device (or of the delivery vehicle). For example, it is contemplated that while making deliveries, the delivery personnel may deviate from instructed route(s). The delivery personnel may come across construction sites, may take alternate routes that the delivery personnel believes is more efficient, and so forth. In this instance, the remote system transmits multiple image(s) of the environment and the device may select which one of these images to display. For example, the image(s) transmitted to the device may include image(s) if the delivery personnel approaches the delivery location form the left or right. If the delivery personnel approaches from the right, for example, then the device may select an image of the environment corresponding to arriving at the delivery location from the left. In some instances, however, the device may transmit the bearing and/or location to the remote system, and the remote system may determine which image of the environment to display. In response, the remote system may transmit a corresponding image to the device for display.

As the delivery personnel approaches the delivery location or progresses along the first portion, the device may display a current location of the delivery personnel. Additionally, the device may display additional images of the environment and based on a current location of the device (or the delivery vehicle) along the delivery route. For example, the images displayed by the device may depict the first portion getting shorter and short in length, and may depict the delivery location appearing closer and closer. The device therefore displays an augmented environment, with turn by turn assistance, as the delivery personnel approaches the delivery location. As such, as the delivery personnel approaches a stop to make the delivery, the device may orient the delivery personnel at the delivery location.

The device also displays image(s) associated with the delivery location and upon completing the first portion or parking at an address associated with the delivery location.

In some instances, the image of the delivery location may include a representation of a front of a house, building, store front, delivery bay, lobby entrance, etc. Upon arriving at the delivery location, an indication of such may be received by the device. For example, the delivery personnel may provide an input indicating a stop at the address and/or the device may track a location along the delivery route. Based on arriving at the address (or completing the driving portion), the device may display an image associated with the delivery location. Additionally, the device may display the delivery route in conjunction with the image of the delivery location. For example, the device may display the delivery route together with the image associated with the delivery location.

Displaying the image of the delivery location along with the second portion of the delivery route allows the delivery personnel to visually observe a specific location at the address at which the delivery personnel is to make the delivery. For example, the delivery personnel may make the delivery to a front door, side door, rear entrance, and so forth. Continuing with the example introduced above, the second portion may represent part of the delivery route the delivery personnel is to walk and the walking portion of the delivery route may be displayed together with the image of the delivery location. This enables the delivery personnel to understand where to walk for making the delivery. For example, in some instances, the address associated with the delivery location may be missing, the address may be unreadable given certain environmental conditions (e.g., dark outside, raining, etc.), or in instances where the delivery personnel is to leave the parcel at a side entrance, the delivery personnel may be instructed as to the location of the side entrance.

In some instances, the second portion of the delivery route (or a portion thereof) may be determined based at least in part on a parking location of the delivery vehicle. For example, a geographical location of the device and/or the delivery vehicle may be used for determining the second portion (or a portion thereof). As such, regardless of where the delivery vehicle parks at the delivery location, the device may display an associated walking path for allowing the delivery personnel to make the delivery. Additionally, the image of the delivery location displayed may be from the location and perspective of where the delivery vehicle stops. In some instances, the device may determine which image of the delivery location to display based on a location at which the delivery personnel arrives at the address (e.g., parking location).

After making the delivery, the delivery personnel may provide an indication of such. For example, the delivery personnel may interact with the device to indicate that they delivered the package. As part of this process, the device may record a time associated with the delivery, a location associated with the device when the delivery was made, and/or a route taken by the delivery personnel in making the delivery to the delivery location. Additionally, or alternatively, in some instances, after making the delivery, the delivery personnel may provide feedback associated with the delivery route. For example, the delivery personnel may indicate whether the delivery route was helpful, incorrect, outdated, whether there was a more efficient route, whether the image data of the environment and/or the delivery location was helpful, incorrect, outdated, and so forth. The feedback may be provided to the remote system for determining updated routes for future deliveries to the delivery location.

Additionally, information associated with the delivery may be utilized for optimizing future deliveries. For example, the time and/or the location associated with the delivery, or a location of the delivery vehicle at the address, may be received for determining faster routes. Such information, for example, may be received from the device and/or additional devices worn by the delivery personnel. In the former instance, sensors of the device (e.g., location component, internal measurement unit (IMU), etc.) may determine a route taken by the delivery personnel. Additionally, or alternatively, the delivery personnel may wear a wearable camera (e.g., head-mounted camera, body camera, etc.) that determines routes (e.g., paths, walkways, etc.) utilized by the delivery personnel during the second portion of the delivery route. By way of example, the delivery personnel may wear a wearable camera that captures a walking path. Image data captured by the wearable camera may be utilized for determining routes taken by the delivery personnel. Additionally, image data obtained from the wearable camera may be combined or used along with location information obtained from the device. This may allow for a precise walking path for the delivery personnel from the parked delivery vehicle to the delivery location. Moreover, as alluded to above, the images captured by the delivery vehicle camera along the delivery route may be transmitted to the remote system for use at later instances when presenting images of the environment.

In some instances, the first portion and/or the second portion of the delivery routes may be updated. For example, in complex residential apartments with multiple walkways and/or multiple entry locations, different delivery personnel may utilize different walking paths for delivering to the same delivery location. The remote system may track a location of the device, routes taken, and/or times associated with the delivery for determining optimized delivery routes. For example, a closest road entry point to the delivery location and the shortest walking path for the delivery personnel may be determined for use in future instances when delivering to the delivery location. The remote system may utilize suitable techniques or machine-learning algorithms to determine whether updated and more efficient routes are available. The machine-learning algorithms may learn the behavior among the delivery personnel and determine optimized delivery routes.

In some instances, images captured by the delivery vehicle camera and/or the wearable camera may be used for presentation on the device to augment the first portion and the second portion of the delivery route, respectively. For example, the wearable camera may capture, in real-time, an image representing a field of view of the delivery personnel. This real-time image may be received by the device for output. Additionally, as part of this process, the second portion of the delivery route may be superimposed on the real-time image captured by the wearable camera. Therefore, as the delivery personnel walks along the second portion of the delivery route to the delivery location, the environment of the delivery personnel (as captured by the wearable camera) may be augmented with the delivery route.

In some instances, the device may display additional instructions to the delivery personnel along the delivery route. By way of example, the device may display access codes (e.g., gate code, lobby door code, etc.) for entering multi-dwelling residences (e.g., apartment complex) and/or multi-business units (e.g., skyscrapers). Moreover, the device may display delivery instructions, such as where to leave the delivery (e.g., behind planter on front porch, at side door, etc.), contact information for a recipient of the delivery, and so forth. Noted above, these delivery instructions may be used in part by the remote system for determining the delivery route, such as the second portion associated with the delivery personnel walking from the delivery vehicle to the delivery location.

The systems and methods described herein may utilize information collected or recorded by onboard geolocating devices and/or devices used by the delivery personnel. For example, the delivery vehicle may include GPS devices and/or the delivery personnel may utilize the devices as part of navigating along the delivery route. Along the delivery route, the delivery vehicle and/or the device of the delivery personnel may record locations and/or the times associated with being at certain locations. Additionally, the delivery vehicle and/or the device may track, record, or determine times associated with the deliveries. For example, the delivery vehicle may record a time at which the delivery vehicle was turned on/off, how long the delivery vehicle was in transmit between deliveries, how long the delivery vehicle is stopped (or not moving), and so forth.

The systems and method disclosed herein improve delivery experiences, increase safety of delivery personnel, and optimize deliveries. The systems and methods may improve delivery route planning for deliveries and navigational instructions along the delivery route. The systems and methods may continuously receive information associated with deliveries across a fleet of delivery vehicles and delivery personnel for determining optimized delivery routes. If certain routes are more efficient than others, these routes may be used for determining updated delivery routes. Additionally, the delivery routes may be augmented to provide an immersive experience that assists the delivery personnel in making deliveries to the correct locations and with reduced hassle. For example, the device may display instructions and/or pathways for navigating pathways in and around the delivery location, entering buildings, and so forth. This may, in effect, reduce the cognitive load of delivery personnel and lead to improved experiences.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example setting associated with augmenting delivery routes. The setting is shown including a remote system 100, a delivery vehicle 102, a delivery device 104 used by a delivery personnel 106, and a wearable device 108 worn by, or a person of, the delivery personnel 106. In some instances, the remote system 100, the delivery vehicle 102, the delivery device 104, and/or the wearable device 108 may be in communication with one another over a network 110.

Figure 2:
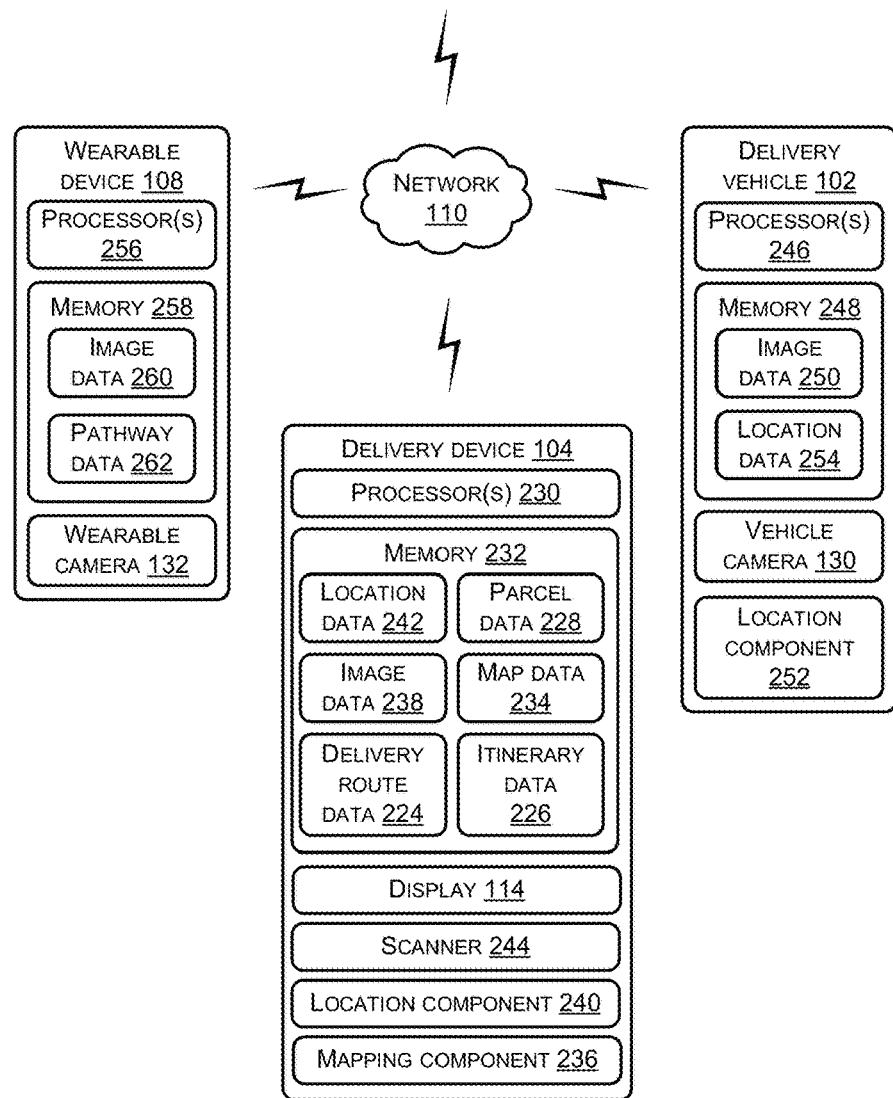
FIG. 2 illustrates example computing components for augmenting delivery routes to increase an efficient of deliveries, according to an embodiment of the present disclosure.

Components of the remote system 100, the delivery vehicle 102, the delivery device 104, and the wearable device 108 are discussed in more detail in relation to FIG. 2. However, generally, the remote system 100 may determine a delivery route associated with a delivery to be made by the delivery personnel 106. The delivery personnel 106 may travel along the delivery route for making the delivery. For example, the delivery personnel 106 may deliver parcels 112 (e.g., packages, boxes, envelopes, letters, containers, bags, etc.) to various addresses, places of business, etc. As part of this process, the delivery personnel 106 may utilize the delivery device 104.

In some instances, the remote system 100 may be associated with a retailer offering goods or services, a courier service that delivers good or services, or other services that either fulfill orders and/or logistically deliver goods and/or services to end customers. In such instances, the remote system 100 may represent a platform, or a component of the platform, for coordinating the delivery of goods and/or services.

The delivery device 104 may include any suitable device capable of displaying the delivery route and/or other information associated with delivering the parcels 112 (e.g., address, time, etc.). In some instances, the delivery device 104 may represent a tablet, personal assistant, phone, mobile device, hand-held computer, wearable glasses, head-mounted displays (HMDs), watches, etc. In some instances, the delivery device 104 may be hand-held and transportable by the delivery personnel 106 during deliveries (e.g., placed in pocket, in-hand, etc.). The delivery device 104 is shown including a display 114 that displays a delivery route 116 to the delivery personnel 106. As the delivery personnel 106 travels along the delivery route 116, the display 114 may output a current location of the delivery personnel 106 along the delivery route 116 and/or a progress associated with delivering the parcels 112.

In some instances, the delivery route 116 may include different portions associated with delivering the parcels 112. The different portions of the delivery route 116 may be associated with different modes of transportation, or stated alternatively, the delivery personnel 106 may utilize different transportation mechanisms (e.g., elevators, stairs, escalators, etc.) along the different portions of the delivery route 116. For example, as it pertains to FIG. 1, the delivery route 116 may include a first portion 118 along which the delivery personnel 106 may utilize the delivery vehicle 102 to drive. Additionally, the delivery route 116 may include a second portion 120 along which the delivery personnel 106 may walk. Both the first portion 118 and the second portion 120 (or additional portions) may be components of the delivery route 116.

FIG. 1 illustrates a succession of presentations on the display 114. As introduced above, the delivery device 104 may display the delivery route 116 associated with delivering the parcel 112 to a delivery location 122 (e.g., apartment building). For example, at "1" the display 114 is shown displaying the delivery route 116. The delivery route 116 is presented in conjunction with other streets, roads, etc. adjacent to the delivery location 122 or along the delivery route 116 to the delivery location 122. As such, the delivery route 116 may be displayed on a map within a vicinity of the delivery personnel 106 (or the delivery vehicle 102). In some instances, the delivery route 116 may be accentuated in comparison to other roads (e.g., highlight, bold, color, etc.). At "1," the delivery location 122 is not shown, however, as the delivery personnel 106 progresses along the delivery route 116, the delivery location 122 and/or a stopping location associated with delivering the parcel 112 to the delivery location 122 may be presented.

As the delivery personnel 106 travels along the delivery route 116, the delivery personnel 106 (or the delivery vehicle 102) may come within a certain proximity, threshold, or distance of the delivery location 122. For example, the threshold distance may be one hundred yards from the delivery location 122. As the delivery personnel 106 travels along the delivery route 116 and comes within one hundred yards of the delivery location 122, the display 114 may present an augmented delivery experience to the delivery personnel 106. For example, as shown at "2" a lower portion 124 of the display 114 may display the delivery route 116 (along with roads adjacent to the delivery location 122). An upper portion 126 of the display 114 may display images associated with an environment 128 of the delivery personnel 106.

Moreover, the delivery route 116 is shown being superimposed onto the image associated with the environment 128. For example, at "2" the display 114 is shown displaying the first portion 118 and the second portion 120 of the delivery route 116 in the upper portion 126. Additionally, the lower portion 124 may display the first portion 118. The first portion 118 and the second portion 120 of the delivery route 116 are shown being superimposed on (or in front of) images of the environment 128. The image of the environment 128 is shown as a street view, from a location and an orientation (e.g., bearing) of the delivery vehicle 102. The augmentation of the delivery route 116 with the image of the environment 128 may orient the delivery personnel 106 within the environment 128 and assist the delivery personnel 106 in making an efficient, safe, and timely delivery. In other words, by displaying the first portion 118 and the second portion 120, the delivery personnel 106 may understand which portions of the delivery route 116 are to be driven and which portions are to be walked.

In some instances, the first portion 118 and the second portion 120 may be presented with different identifiers, such as a line colors, line styles (e.g., solid, dashed, etc.), and so forth. In some instances, as the delivery personnel 106 continues to travel along the delivery route 116, such as the first portion 118, the image of the environment 128 as displayed in the upper portion 126 may update, along with a remaining indication of the delivery route 116. For example, as discussed herein, the delivery device 104 may include a location component that determines a location of the delivery personnel 106 for use in augmenting the delivery route 116 and displaying additional images of the delivery location 122.

In some instances, the images of the environment 128 may be previously captured via a camera of the delivery device 104 (or a camera of another delivery device 104) and/or a vehicle camera 130 of the delivery vehicle 102 (or a camera of another delivery vehicle 102). For example, the vehicle camera 130 may represent a dashboard camera placed on a dashboard within the delivery vehicle 102. The image of the environment 128, as shown, may be determined via the remote system 100 as part of determining the delivery route 116. For example, after determining the delivery route 116, the remote system 100 may determine corresponding image(s) of the environment 128 along the delivery route 116. As noted, this image data may be previously captured by the vehicle camera 130 (or vehicle cameras of other delivery vehicles). The remote system 100 may retrieve the image(s) of the environment 128 based on the delivery route 116. In some instances, however, the remote system 100 may determine multiple image(s) of the environment 128 along the delivery route 116 for transmitting to the delivery device 104. The delivery device 104 may determine which image of the environment 128 to display based on a bearing or location of the delivery personnel 106. For example, the delivery personnel 106 may approach the delivery location 122 from multiple locations, regardless of the instructed delivery route 116. Construction or more efficient routes, for example, may cause the delivery personnel 106 to deviate from the instructed delivery route 116. In some instances, the delivery device 104 may therefore select which image of the environment 128 to display. However, such determination may be made by the remote system 100, using the bearing and/or location of the delivery personnel 106. It should be understood, however, that the vehicle camera 130 may capture and record image data of the environment 128 along the delivery route 116 for use at later instances when augmenting the delivery routes 116. For example, images captured by the vehicle camera 130 may be used when making a second delivery to the delivery location 122.

Upon arriving at an address associated with the delivery location 122, or after completing the first portion 118, the delivery personnel 106 may provide an indication of such. This may indicate that the first portion 118 of the delivery route 116 has been completed. For example, the delivery personnel 106 may touch an icon (e.g., "Parked") presented on the display 114. In response, the delivery device 104 may display an image associated with the delivery location 122. Additionally, the delivery device 104 may display the second portion 120 of the delivery route 116. For example, at "3" the delivery device 104 is shown displaying an image associated with the delivery location 122 along with the second portion 120 of the delivery route 116. The second portion 120 may be superimposed on (or in front of) the image associated with the delivery location 122. This allows the delivery personnel 106 to easily understand a route to take for delivering the parcel 112 to the delivery location 122.

In some instances, the image of the delivery location 122 may be received from the remote system 100 as part of the delivery device 104 receiving the delivery route 116 (and/or other instructions associated with delivering the parcel 112). Additionally, or alternatively, the images may be obtained via an additional camera of the delivery vehicle 102 (e.g., on a side). The image at "3" is shown from a location and an orientation of the delivery vehicle 102 at the delivery location 122. This may further assist in orienting the delivery personnel 106 within the environment 128 for delivering the parcel 112.

The delivery device 104 at "3" is further shown including an icon associated with delivering the parcel 112. For example, upon making the delivery, the delivery personnel 106 may touch an icon (e.g., "Delivered") presented on the display 114. This may indicate that the delivery was successfully made. In such instances, after completing the delivery route 116, the delivery device 104 may display an additional route for delivering additional parcels 112. Additionally, or alternatively, the delivery device 104 may record data associated with delivering the parcel 112, such as a time of delivering the parcel 112, a location of delivering the parcel 112, a route taken by the delivery personnel 106 while delivering the parcel 112, and so forth.

Introduced above, during deliveries, the delivery personnel 106 may wear the wearable device 108 including a wearable camera 132. As shown, the wearable device 108 may include a vest, however, the wearable device 108 may include other garments or items including the wearable camera 132. For example, the wearable device 108 may include a hat having the wearable camera 132, a band having the wearable camera 132, and so forth. Images captured by the wearable device 108 (via the wearable camera 132) may be analyzed for determine routes, pathways, or walkways of the delivery personnel 106 within the environment 128, at an address associated with the delivery location, and/or at the delivery location 122. These images may be used for updating or determining the delivery routes 116 in future instances. In some instances, images captured by the wearable device 108 may be utilized for optimizing the second portion 120 of the delivery route 116. Additionally, locations of the delivery vehicle 102, the delivery device 104, and/or the wearable device 108 may be recorded for use in determining updated delivery routes 116 in future instances.

Although the discussion herein is with regard to determining the delivery routes 116 for delivering the parcels 112, the systems and methods discussed herein may determine delivery routes 116 for delivering other goods. For example, a delivery route for delivering food (e.g., pizza, etc.) or other goods (e.g., e.g., groceries, flowers, etc.) may be determined and presented to devices of delivery personnel. Additionally, delivery routes for services may be determined. By way of example, a customer may schedule a cleaning service. Here, a route associated with traveling to a residence of the customer may be determined and displayed on a device of personnel the cleaning service. Additionally, the route may be augmented with images of the environment and/or the residence, as similarly discussed above with delivering the parcels 112.

FIG. 2 illustrates example components of the remote system 100, the delivery vehicle 102, the delivery device 104, and the wearable device 108. The remote system 100 may include processor(s) 200 and memory 202, which may store or otherwise have access to various modules, components, and/or database(s). The memory 202 may store or otherwise have access to a delivery route component 204. In some instances, the delivery route component 204 may determine the delivery routes 116 utilizing information stored in a parcel database 206 and/or an address database 208. The parcel database 206 may include a database of the parcels 112 to be delivered. The address database 208 may include information associated with identifying or determining an address to which the parcels 112 are to be delivered. The remote system 100, such as the delivery route component 204, may determine the delivery routes 116 using the parcel database 206 and/or the address database 208. For example, as the parcel database 206 may identify the parcels 112 to be delivered, and the address database 208 may include identifying information associated with the delivery of the parcels 112 (e.g., address, location, etc.). The delivery route component 204 may determine the delivery route 116 for use by the delivery personnel 106.

The delivery routes 116 may be stored in a delivery route database 210. Generally, the delivery route 116 may represent a path, trajectory, or course that the delivery personnel 106 is to follow to traverse through an environment and deliver the parcel 112. The delivery routes in the delivery route database 210 may also represent previous delivery routes. The delivery route component 204 may determine a delivery route to travel from a first location (e.g., current location) to a second location (e.g., delivery location). For the purpose of this discussion, the delivery route 116 may be a sequence of waypoints for traveling between two locations. As non-limiting examples, waypoints may include streets, intersections, global positioning satellite (GPS) coordinates, addresses, etc. Further, the delivery route component 204 may generate instructions for guiding the delivery personnel 106 along the delivery route 116 from the first location to the second location. By way of example, the delivery route component 204 may determine how to guide the delivery personnel 106 from a first waypoint in the sequence of waypoints to a second waypoint in the sequence of waypoints.

The remote system 100 may include a mapping component 212 that assists the delivery route component 204, or is used alongside the delivery route component 204, for mapping (e.g., charting) the delivery route 116. The mapping component 212 may be associated with a map database 214 that indicates roadways, intersections, walkways, bridges, sidewalks, delivery bays, mountain ranges, terrain, the environment in general, and so forth. Accordingly, as part of determining the delivery route 116, the delivery route component 204 may be in communication with the mapping component 212 for knowing roadways along which the delivery personnel 106 is to travel and turns or maneuvers along the delivery route 116.

The delivery routes 116 is/are shown including or being associated with the delivery location 122. In some instances, the delivery location 122 may be associated with a geographical location at which the delivery personnel 106 is to physically deliver the parcel 112. This may include, without limitation, a place of business, a residential address, apartment or building complexes, delivery bays, mail rooms, lobbies, and so forth. In some instances, the delivery location 122 may represent a point along the delivery route 116 whereby the delivery personnel 106 is instructed to drop off, leave, deliver, or place the parcel 112.

As part of generating the delivery route 116, the delivery route component 204 may determine portions of the delivery route 116 that are associated with different modes of travel. In some instances, the different modes of travel may include driving, walking, riding a bicycle, taking stairs, riding an elevator, riding an escalator, boating, and so forth. For example, certain portions of the delivery route 116 may be driven by the delivery personnel 106 and certain portions of the delivery route 116 may be walked by the delivery personnel 106. Portions of the delivery route 116 that are to be driven or walked may be based on the geographical, physical, or structural characteristics of the delivery location 122. As a brief example, in delivering the parcel 112 to a delivery location, such as a residential address, the delivery personnel 106 may drive to the residential address, park on the street, and then walk to the front door to drop off the parcel 112. These portions may be stored in association with the delivery routes 116 as the first portion 118 and the second portion 120. However, it is to be understood that the delivery route 116 may include different portions, such as portions that are to be biked by the delivery personnel 106. The delivery route 116 may indicate which portions of the delivery route 116 are to be driven, walked, or biked, respectively. In some instances, the delivery route 116 may include stop locations at which the delivery personnel 106 is instructed to stop the delivery vehicle 102. After stopping the delivery vehicle 102, the delivery personnel 106 may be instructed to walk the remaining portion of the delivery route 116 (e.g., the second portion 120) for delivering the parcel 112 to the delivery location 122.

In some instances, the delivery route component 204 may determine the first portion 118 and the second portion 120 using the mapping component 212 and/or by accessing the map database 214. For example, the delivery route component 204 may identify, using maps stored in the map database 214, which portions of the delivery route 116 are capable of being driven and which portions of the delivery route 116 are capable of being walked. As an example, if the delivery location 122 corresponds to a front porch of a residential address, the delivery route component 204 may determine that the delivery personnel 106 cannot physically drive to the front porch. Instead, the delivery route component 204 may determine which portions of the delivery route 116 are to be driven, for example, by indicating that the delivery vehicle 102 is to be parked along a street in front of the residential address. Therein, the delivery route component 204 may determine that the delivery personnel 106 is to walk a remaining portion of the delivery route 116 using a sidewalk, for example, to drop off the parcel 112 on the front porch. This determination may be additionally, or alternatively, made by the mapping component 212. That is, as part of determining the delivery route 116, the mapping component 212 may determine or indicate which portions of the delivery route 116 are capable of being driven and walked.

The delivery route database 210 may also store previous delivery routes 116 among the delivery personnel 106. For example, for a given delivery schedule (e.g., hourly, daily, weekly, etc.), the delivery route component 204 may determine the delivery routes 116 for the delivery personnel 106. As indications of new parcels 112 to be shipped are received, the delivery route component 204 may determine additional delivery routes 116 for the delivery personnel 106. As such, the remote system 100 may store a historical database associated with the delivery routes 116. In such instances, the delivery route database 210 may indicate the delivery locations 122, navigational maneuvers (e.g., stop, turn, etc.), a time associated with deliveries along the delivery route 116 (e.g., parked, arrived, delivered, etc.), and so forth. In some instances, the delivery route component 204 may utilize the delivery routes 116 of previous deliveries for determining current delivery routes 116.

Additionally, or alternatively, the delivery routes 116 of previous deliveries may be used to indicate which portions were driven or walked. For example, upon arriving at an address, the delivery vehicle 102 may be parked (or powered off) and an indication of such may be recorded. This may indicate that the delivery vehicle 102 stopped driving and/or completed the first portion 118. Additionally, the delivery personnel 106 may have the delivery device 104 on their person and locations of the delivery device 104 may be tracked for knowing the location and/or route taken by the delivery personnel 106 during delivery of the parcel 112.

The memory 202 is further shown including, or having access to, itineraries 216, profiles 218, an image database 220, and thresholds 222. The itineraries 216 may correspond to delivery calendars, agendas, or schedules of the delivery personnel 106. For example, for a given day, the delivery personnel 106 may have a plurality of deliveries to make to respective delivery locations 122. Each of the deliveries may be associated with a respective delivery route 116. For example, after delivering a first parcel at a first location, the delivery route 116 may indicate a route for traveling from the first location to a second location for delivering a second parcel. In some instances, the itineraries 216 may be provided to the delivery personnel 106 at the beginning of each day, delivery shift, or on a continuous basis.

The profiles 218 may be associated with customers, recipients, addresses, and/or characteristics of the delivery location 122. In some instances, the profiles 218 may indicate delivery instructions associated with the delivery of the parcels 112. By way of example, the instructions may identify access codes (e.g., gate code, callbox number etc.), special delivery request (e.g., leave package on front porch), and so forth.

The image database 220 may store images associated with the delivery routes 116 and the delivery locations 122 and may be black and white and/or colored. The images may include two dimension (2D) or three-dimensional (3D) images. The images associated with the delivery route 116 may represent an environment along the delivery route 116, such as streets, buildings, housings, etc. More generally, the images of the environment may represent a street view along the delivery route 116. Comparatively, the images of the delivery locations 122 may represent a residence, place of business, complex, etc.

As discussed herein, the image(s) of the environment may be previously captured via the vehicle camera 130 (or vehicle camera of other delivery vehicles) during previous deliveries. Upon determining the delivery route 116, the remote system 100, such as the delivery route component 204, may determine which image(s) to present of the environment. For example, after determining the delivery route 116, the delivery route component 204 may determine image(s) corresponding to the delivery route 116. As part of this process, multiple image(s) of the environment may be determined. For example, there may be multiple bearings for approaching the delivery location 122 and based on the location and bearing of the delivery personnel 106, an appropriate image may be displayed. In some instances, the delivery device 104 or the remote system 100 may determine which image of the environment to display.

In some instances, the images stored in the image database 220 may be stored in association with the addresses in the address database 208. As such, if a parcel 112 is to be delivered to a particular address, an image of that address may be appropriately determined. The images stored in the image database 220 may be used for presentation to the delivery personnel 106, via the delivery device 104, along with the delivery route 116. Presenting the delivery route 116 with the images of the environment and the delivery location 122 may assist to orient the delivery personnel 106 within the environment for delivering the parcel 112 to the proper location.

The thresholds 222 may correspond to proximity or location thresholds (e.g., time, distance, etc.) of the delivery location 122. In some instances, the thresholds 222 may correspond to a geographical location along the delivery route 116 or may correspond to a geofence placed around the delivery location 122. The thresholds 222 may be utilized for triggering one or more displays presented to the delivery personnel 106. For example, as the delivery personnel 106 comes within the threshold 222, the delivery device 104 may display an augmented environment for delivering the parcel 112. In some instances, the thresholds 222 may be location-based, such as 50 yards or 100 yards to the delivery location 122, or may be time-based, such as 10 seconds or 20 seconds to the delivery location 122. In other words, as the delivery personnel 106 comes within 50 yards of the delivery location 122, the delivery device 104 may display an augmented environment. The augmentation may include presenting the image of the environment along with the first portion 118 and the second portion 120, or presenting the image of the delivery location 122 along with the second portion 120.

The remote system 100 may communicate with the delivery device 104 for providing delivery route data 224 associated with the delivery route(s) 116 of the delivery personnel 106, itinerary data 226 associated with the itinerary 216 of the delivery personnel 106, and/or parcel data 228 corresponding to the parcels 112 to be delivered by the delivery personnel 106. As shown, delivery device 104 may include processor(s) 230 and memory 232, and the memory 232 may store or otherwise have access to the delivery route data 224, the itinerary data 226, and/or the parcel data 228. Additionally, the memory 232 may store the image data 238, which may correspond to images from the image database 220 and represent the environment and the delivery location 122.

The delivery device 104 may present the delivery route data 224, the itinerary data 226, and/or the parcel data 228 to the delivery personnel 106. The delivery device 104 includes the display 114 for presenting information associated with the delivery route data 224, the itinerary data 226, and/or the parcel data 228. For example, the delivery device 104 may display the delivery route 116 along which the delivery personnel 106 is to travel. In some instances, the delivery device 104 may receive the delivery route data 224, the itinerary data 226, the parcel data 228, and/or the image data 238 according to a predetermined schedule, such as in the morning or at night. For example, prior to beginning a delivery schedule, the remote system 100 may transmit the delivery route data 224, the itinerary data 226, the parcel data 228, and/or the image data 238 to the delivery device 104. The delivery device 104 may store the delivery route data 224, the itinerary data 226, the parcel data 228, and/or the image data 238 for use by the delivery personnel 106 during deliveries.

As part of displaying the delivery route 116, the memory 232 may store or have access to map data 234 associated with a map of the environment. In some instances, the delivery device 104 may store or have access to a mapping component 236 or module that plots the delivery route 116 on a map for traveling by the delivery personnel 106. As such, the display 114 may present the delivery route 116 along with a map of an environment traveled by the delivery personnel 106. Moreover, the display 114 may also present images captured by the delivery vehicle 102 and/or the wearable device 108.

In some instances, the mapping component 236, or other portions of the delivery device 104, may determine portions of the delivery route 116. For example, depending on where the delivery vehicle 102 parks when making a delivery, the delivery device 104 may determine an updated walking route associated with the second portion 120. By way of example, a car may be parked at the instructed parking location. Here, the delivery personnel 106 may park the delivery vehicle 102 at a different location and the delivery device 104 may determine an updated second portion 120. Additionally, the delivery personnel 106 may deviate from instructed delivery routes 116 and the mapping component 236 may determine updated delivery routes 116 based on a current location and bearing.

The memory of the delivery device 104 is further shown including or having access to the image data 238 that may represent image(s) of the environment, the delivery route 116, and/or the delivery locations 122. The image data 238 may be received by the delivery device 104 from the remote system 100, along with the delivery route data 224, the itinerary data 226, and/or the parcel data 228 (as noted above). The image data 238 may be displayed on the display 114 as the delivery personnel 106 arrives within the threshold 222 of the delivery location 122 (or crosses certain geographical triggers) and/or as the delivery personnel 106 arrives at the delivery location 122 (or begins the second portion 120 of the delivery route 116). For example, as the delivery personnel 106 approaches the delivery location 122, the display 114 may present image(s) of the environment, which depicts streets, houses, etc. around the delivery location 122. The first portion 118 and/or the second portion 120 may also be displayed in conjunction with the image(s) of the environment or on images of the environment. In doing so, the delivery personnel 106 may understand where to drive within the environment. In some instances, the delivery device 104 may determine which image data 238 of the environment to present based on a bearing and/or location of the delivery personnel 106.

Additionally, as the delivery personnel 106 completes the first portion 118, an image of the address or delivery location 122 may be displayed. For example, envision that the delivery location 122 is a front porch of a house. The image associated with the delivery location 122 may represent a front of the house, and the second portion 120 of the delivery route 116 may be displayed along with the image. In doing so, the delivery route 116 may be augmented with the image of the house to instruct the delivery personnel 106 where to walk for delivering the parcel 112. In some instances, the delivery device 104 may determine which image data 238 to present of the delivery location 122 based on a parking location of the delivery vehicle 102. The image data 238 may also represent images as received from the delivery vehicle 102 and/or the wearable device 108.

The delivery device 104 is further shown including a location component 240. The location component 240 may determine locations of the delivery device 104 as the delivery personnel 106 delivers the parcels 112. In some instances, the delivery personnel 106 may carry the delivery device 104 on their person. As the delivery personnel 106 delivers the parcels 112, the location component 240 may record locations as location data 242. The locations may represent a geographical location (e.g., GPS coordinates, address, pinpoint, etc.) of the delivery personnel 106 at particular points in time. In some instances, the location data 242 may be used for determining actual delivery routes 116 taken by the delivery personnel 106. These delivery routes 116 may be used for updating or determining new delivery routes 116 in future instances. Moreover, as part of recording the location of the delivery personnel 106, the location component 240 may record a time at which the delivery personnel 106 was at a particular location. For example, the location component 240 may record a time and location when the delivery personnel 106 delivered the parcel 112, parked the delivery vehicle 102, and so forth.

The delivery device 104 may, in some instances, include a scanner 244 for scanning the parcels 112. Scanning the parcels 112 may serve to indicate when the parcels 112 were delivered. For example, as part of delivering the parcel 112, the delivery personnel 106 may scan a barcode, QR codes, or other identifiers (e.g., series of numbers, etc.). This may indicate that the parcel 112 was delivered at the delivery location 122. In some instances, as part of scanning the parcel 112, the delivery device 104 may record a time and/or location (via the location component 240) for determining a time at which the parcel 112 was delivered and/or a location at which the parcel 112 was delivered. For example, the location component 240 may determine a location at which the parcels 112 were scanned.

Although not illustrated, the delivery device 104 may further include additional sensor(s), input device(s), and/or output device(s). For example, the delivery device 104 may include inertial sensor(s) (e.g., inertial measurement units (IMUs), accelerometers, magnetometers, gyroscopes, etc.), microphone(s), camera(s), buttons, loudspeaker(s), lighting element(s), and so forth.

The delivery vehicle 102 may include processor(s) 246 and memory 248, which may store or otherwise have access to various modules, components, and/or database(s). The memory 248 is shown including image data 250 corresponding to images and/or video captured by the vehicle camera 130. In some instances, the image data 250 captured by the vehicle camera 130 may be transmitted to the remote system 100 and associated with geographical locations and/or delivery routes 116. The image data 250 may be stored in the image database 220 for use by the remote system 100 at later instances when determining image data of the environment to display to the delivery personnel 106 along delivery routes 116. The image data 250 captured by the vehicle camera 130 may be used to augment the delivery route 116 along the first portion 118. In some instances, the vehicle camera 130 may continuously capture the image data 250 or may capture the image data 250 based on arriving within a certain distance of the delivery location 122.

In some instances, the vehicle camera 130 may represent a dashboard camera placed on a dashboard within the delivery vehicle 102. The vehicle camera 130 may be oriented to capture images and/or video (e.g., the image data 250) in front of the delivery vehicle 102, relative to a direction of travel of the delivery vehicle 102. In some instances, the image data 250 captured by the vehicle camera 130 may represent a street view within the environment of the delivery personnel 106.

The delivery vehicle 102 is further shown including a location component 252 that records a location of the delivery vehicle 102. The memory 248 may store location data 254 associated with the location of the delivery vehicle 102. The location data 254 may be utilized for determining routes traveled by the delivery vehicle 102. The location data 254 may be associated with the image data 250 for knowing locations within an environment that the image data 250 represents. These routes may be used to update the delivery routes 116, determine more efficient delivery routes 116, and so forth. As such, as the delivery vehicle 102 travels within an environment, the location component 252 may track a location of the delivery vehicle 102 and record locations of the delivery vehicle 102.

In some instances, the delivery personnel 106 may wear the wearable device 108. The wearable device 108 may include processor(s) 256 and memory 258. The memory 258 may store image data 260 as captured by the wearable camera 132. For example, as the delivery personnel 106 walks about an environment, the wearable camera 132 may capture images of the environment. The image data 260 as captured by the wearable camera 132 may be used to determine walking routes, pathways, trails, and so forth taken by the delivery personnel 106. Additionally, the image data 260 as captured by the wearable camera 132 may be transmitted to the remote system 100 as stored in the image database 220. The wearable camera 132 may be oriented to capture an environment of the delivery personnel 106, and in front of the delivery personnel 106. Such images may be used to depict the delivery location 122 and which are transmitted to the delivery device 104 for augmenting the second portion 120 of the delivery route 116.

The processor(s) 256 or other components stored in the memory 258 may analyze the image data 260 for determining pathways of the delivery personnel 106. These pathways may be stored as pathway data 262 in the memory 258. For example, the image data 260 may be analyzed to perform object detection and/or segmentation. The object detection and/or segmentation may identify sidewalks, walkways, breezeways, etc. along which the delivery personnel 106 walks to deliver the parcel 112 to the delivery location 122. The pathway data 262 may be used in future instances when determining the delivery routes 116. More specifically, in some instances, the pathway data 262 may be used to determine the second portion 120 of the delivery routes 116. This image analysis may additionally or alternatively be performed by the remote system 100.

The network 110 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The remote system 100, the delivery device 104, the delivery vehicle 102, and the wearable device 108 may include one or more network interface(s) for permitting communication over the network 110. Additionally, the remote system 100, the delivery vehicle 102, the delivery device 104, and the wearable device 108 may include application program interfaces (APIs) that allow applications operating on the remote system 100, the delivery vehicle 102, the delivery device 104, and the wearable device 108 to interact with one another, exchange data, and so forth.

Although FIG. 2 schematically depicts the remote system 100, the delivery vehicle 102, the delivery device 104, and the wearable device 108, the components discussed herein may be embodied within a single system or device. Additionally, components may be arranged differently than shown and the remote system 100, the delivery vehicle 102, the delivery device 104, and the wearable device 108 may perform some or all of the operations described herein. By way of brief example, the delivery personnel 106 may travel along a delivery route 116 as determined by the remote system 100. However, the delivery personnel 106 may park the delivery vehicle 102 at a location other than that instructed (e.g., parked car, construction, etc.). In such instances, the delivery device 104 may determine an updated delivery route 116 to instruct the delivery personnel 106 how to complete the delivery given the new parking location. In some instances, the delivery device 104 may determine portions of the delivery route 116 corresponding to the first portion 118 or the second portion 120.

In some instances, the vehicle camera 130 and/or the wearable camera 132 may include a high-resolution camera, a depth sensor, infrared (IR) sensor, red-green-blue (RGB) camera, and/or other imagining devices and/or sensors. The display 114 of the delivery device 104 may be implemented as a high-resolution display, an e-ink display, a tactile electronic display (e.g., refreshable Braille displays), a segment display, a light-emitting diode (LED) display, a liquid crystal display (LCDs), a laser display, a holographic display, and the like. Additionally, in some instances, the display 114 may be touch sensitive and capable sensing touch input (e.g., resistive, capacitive, etc.).

In some instances, the remote system 100 may be implemented as one or more servers and may, in some instances, form a portion of a network-accessible computing platform implemented as a computing infrastructure of processors, storage, software, data access, etc. that is maintained and accessible via a network such as the Internet. The remote system 100 does not require end-user knowledge of the physical location and configuration of the system that delivers the services. Common expressions associated for the remote system 100 include "on-demand computing", "software as a service (SaaS)", "platform computing", "network-accessible platform", "cloud services", "data centers", etc.

As used herein, a processor, such as the processor(s) 200, 230, 246, and/or 256 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 202, 232, 248, and/or 258 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 3A:
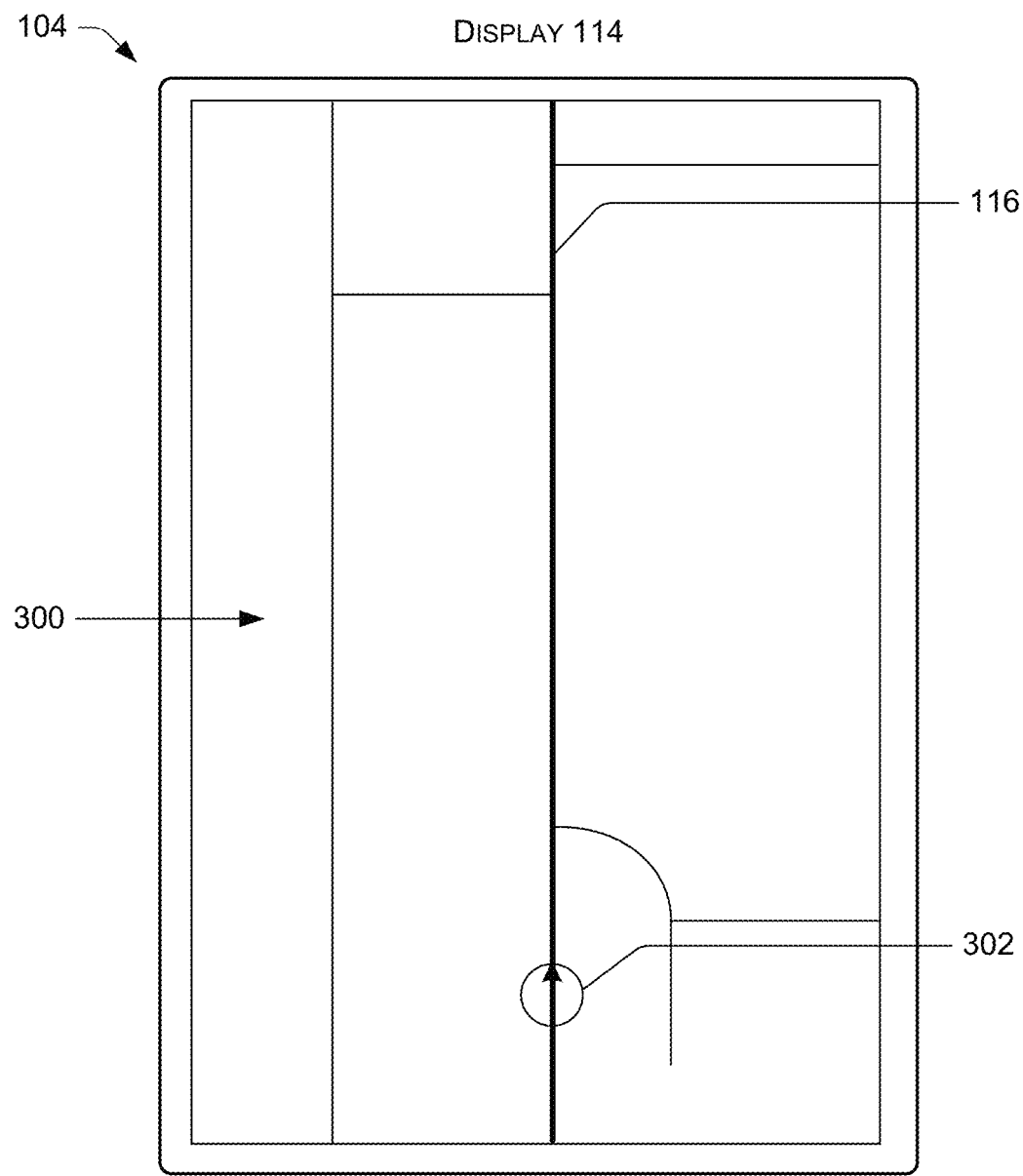
FIG. 3A illustrates an example display augmenting a first portion of an example delivery route, according to an embodiment of the present disclosure.
Figure 3B:
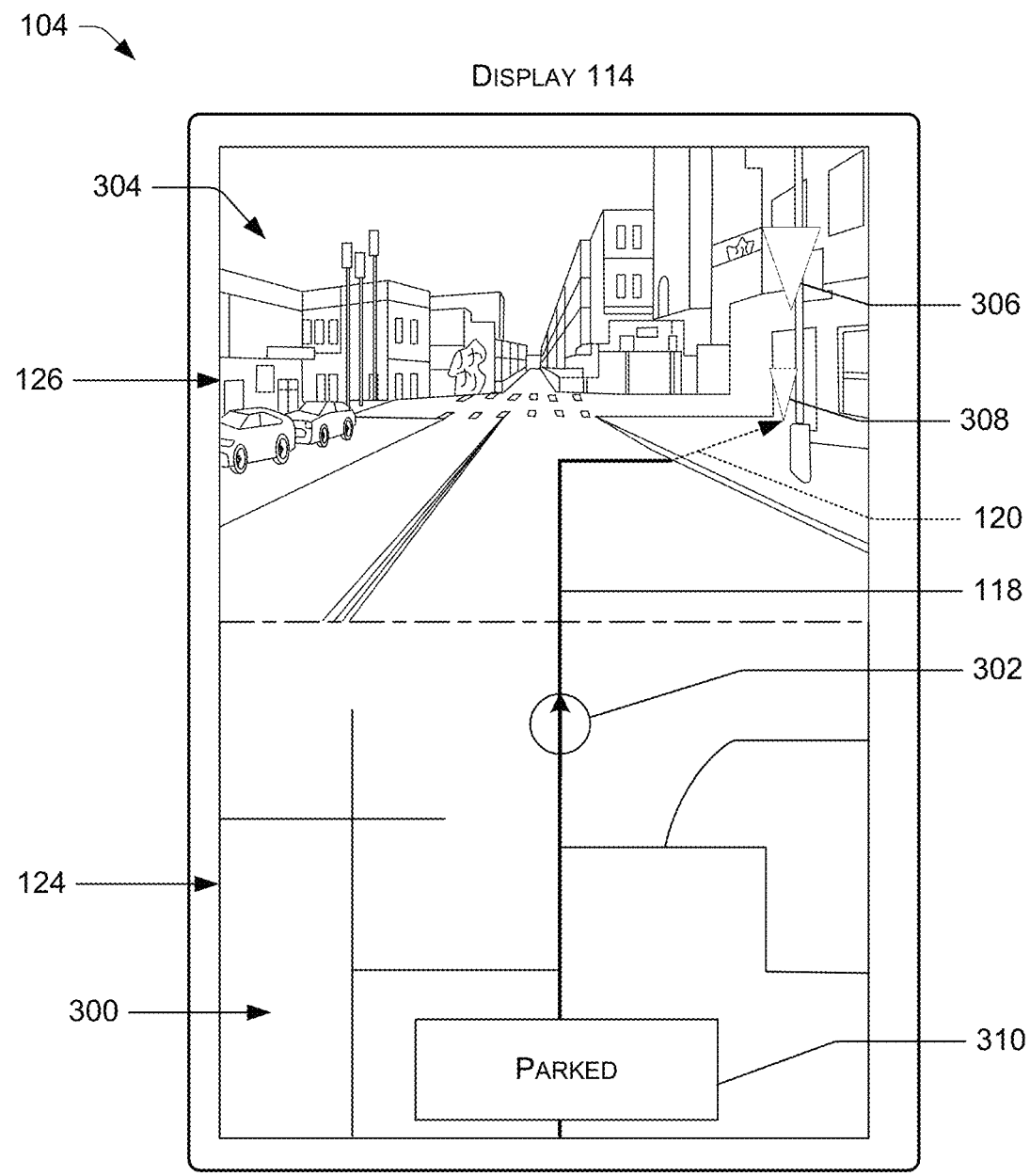
FIG. 3B illustrates an example display augmenting a second portion of the delivery route of FIG. 3A, along with an image of an environment, according to an embodiment of the present disclosure.
Figure 3C:
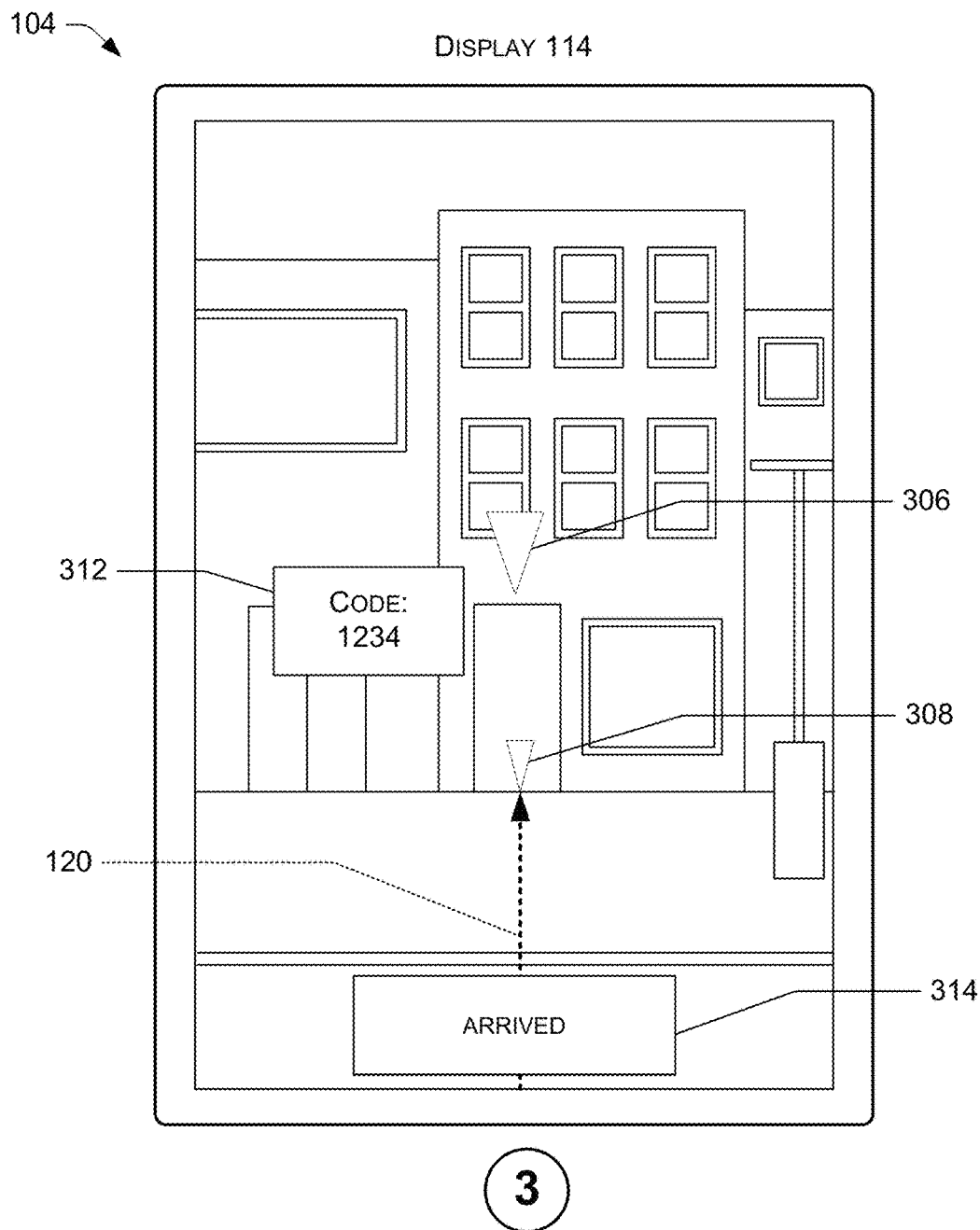
FIG. 3C illustrates an example display augmenting a third portion of the delivery route of FIG. 3A, along with an image associated with a delivery location, according to an embodiment of the present disclosure.

FIGS. 3A-3C illustrate additional details of the display 114 presented on the delivery device 104 and as introduced above with regard to FIG. 1. Particularly, FIG. 3A illustrates additional details of the display 114 presented at "1," FIG. 3B illustrates additional details of the display 114 presented at "2," and FIG. 3C illustrates additional details of the display 114 presented at "3."

In FIG. 3A, the delivery route 116 is shown displayed in conjunction with a map 300 of the environment. The map 300 may include streets, intersections, roads, and so forth within an environment of the delivery personnel 106 (or of an environment traveled by the delivery vehicle 102). The delivery route 116 may be represented within the map 300 and displayed on certain streets. In some instances, the delivery route 116 may be emphasized on the display 114 (e.g., color, line weight, line style, etc.) in comparison to other streets not on the delivery route 116.

The display 114 may update as the delivery personnel 106 travels along the delivery route 116. For example, an icon 302 may be representative of the location of the delivery personnel 106 along the delivery route 116. As the delivery personnel 106 travels along the delivery route 116, the location of the icon 302 may update and subsequent portions of the delivery route 116 may be presented. As introduced above, the delivery device 104 may include components (e.g., mapping component 236) for rendering the display 114 of the delivery route 116, as well as a progress of the delivery personnel 106 along the delivery route 116.

As the delivery personnel 106 progresses along the delivery route 116, the delivery personnel 106 may come within the threshold 222 of the delivery location 122. For example, the location of the delivery personnel 106 may be determined via a location component of the delivery vehicle 102 and/or of the delivery device 104. By comparing the location of the delivery personnel 106 to the threshold 222, the delivery device 104 may determine whether the delivery personnel 106 is at or within the threshold 222. In response, the delivery device 104 may augment display of the delivery route 116 with images of an environment 304. Alternatively, the delivery personnel 106 may cross a certain geographical trigger for augmenting the delivery route 116.

For example, in FIG. 3B, the upper portion 126 is shown displaying the environment 304. Images of the environment 304 may represent images previously captured by the vehicle camera 130 (and/or another vehicle camera from other delivery vehicles). The images may be transmitted from the remote system 100 to the delivery device 104, as part of the delivery device 104 receiving information associated with an itinerary of deliveries. In some instances, the remote system 100 may transmit more than one image such that the delivery device 104 may display a succession of images as the delivery personnel 106 approaches the delivery location 122. The augmentation of the delivery route 116 may allow the delivery personnel 106 to orient themselves within the environment 304 and visually observe the delivery route 116 within the environment 304.

As shown at "2" in FIG. 3B, the upper portion 126 may display the first portion 118 and the second portion 120 along with the images of the environment 304. The presentation on the display 114 may represent a current location and orientation of the delivery vehicle 102 along the delivery route 116. For example, the delivery device 104 may utilize a location and/or bearing of the delivery vehicle 102 as part of displaying images of the environment 304, or as part of determining which images of the environment 304 to display. The first portion 118 may include a visual indication as to where the delivery personnel 106 is to drive the delivery vehicle 102. The second portion 120 may include a visual indication as to where the delivery personnel 106 is to walk. As shown, the first portion 118 and the second portion 120 may be displayed with respective indicators (e.g., line weight, line style, line color, etc.) for visually indicating to the delivery personnel 106 the respective portions of the delivery route 116.

The upper portion 126 is further shown displaying a first representation 306 associated with the delivery location 122 and a second representation 308 associated with the delivery location 122. In some instances, the first representation 306 may be disposed vertically above the delivery location 122, while the second representation 308 may be disposed at an actual physical location associated with the delivery location 122 and at which the delivery personnel 106 is to deliver the parcel 112. In some instances, the first representation 306 may assist in guiding the delivery personnel 106 to a general vicinity of the delivery location 122, while the second representation may assist in guiding the delivery personnel 106 to the actual delivery location 122.

At "2" the lower portion 124 may display the delivery route 116, such as the first portion 118 of the delivery route 116. The lower portion 124 may also display the map 300 of the environment 304, along with the delivery route 116. The icon 302 associated with the current location of the delivery personnel 106 (and/or the delivery device 104 and/or the delivery vehicle 102) is presented along the delivery route 116.

Upon arriving at the delivery location 122, the delivery personnel 106 may provide an indication of such. For example, as the delivery personnel 106 travels along the first portion 118, and completes the first portion 118, the delivery personnel 106 may provide an indication of such. For example, the delivery personnel 106 may touch a parked icon 310 (e.g., "Parked") presented on the display 114. In response to receiving this input, the delivery device 104 may display an image associated with the delivery location 122 and the second portion 120. That is, at "3" the display 114 may present the second portion 120 and an image representing the delivery location 122 within the image of the delivery location 122.

In some instances, the image presented at "3" may be received from the remote system 100 as part of receiving the delivery route 116, the itinerary data 226, the map data 234, etc. Additionally, the image presented may be from the location and orientation of the delivery personnel 106 upon stopping or completing the first portion 118. For example, depending on where the delivery personnel 106 parks or stops the delivery vehicle 102, an associated image of the delivery location 122 may be presented. In such instances, the delivery device 104 may determine an appropriate image of the delivery location 122 to display. To illustrate, if another vehicle is parked where the delivery vehicle 102 is to stop, and the delivery vehicle 102 cannot park as indicated by the delivery route 116, the delivery personnel 106 may park at additional locations (e.g., in front of the additional vehicle, behind the additional vehicle, etc.). In such instances, after parking, the delivery personnel 106 may provide an input to the parked icon 310. A location at which the delivery personnel 106 provides the indication may be used to determine the image to display. Additionally, the second portion 120 of the delivery route 116 may be determined (or updated) based on the current location when the parked icon 310 is pressed. The second portion 120 of the delivery route 116 may be determined between a location associated with pressing the parked icon 310 and a location associated with the delivery location 122. In such instances, the delivery device 104 may determine (or update) the second portion 120 of the delivery route 116 for displaying on the image of the delivery location 122, along with the second portion 120.

FIG. 3C further illustrates that at "3," the display 114 may present the first representation 306 and the second representation 308. Additionally, the display 114 may present delivery instructions 312 (as determined from the profiles 218) associated with delivering the parcel 112. As illustrated in FIG. 3C, the delivery instructions 312 may include a code for accessing a front door, or lobby, of the delivery location 122. The delivery instructions 312 may be presented as the delivery personnel 106 approaches the delivery location 122 and/or in response to the delivery personnel 106 pressing the parked icon 310.

As also shown, the display 114 may present an arrived icon 314. The delivery personnel 106 may touch the arrived icon 314 based on arriving at the delivery location 122 and delivering the parcel 112. In some instances, the delivery personnel 106 may scan the parcel 112, using the scanner 244, to indicate the delivery. In some instances, as part of delivering the parcel 112, a time and/or location may be recorded.

Figure 4:
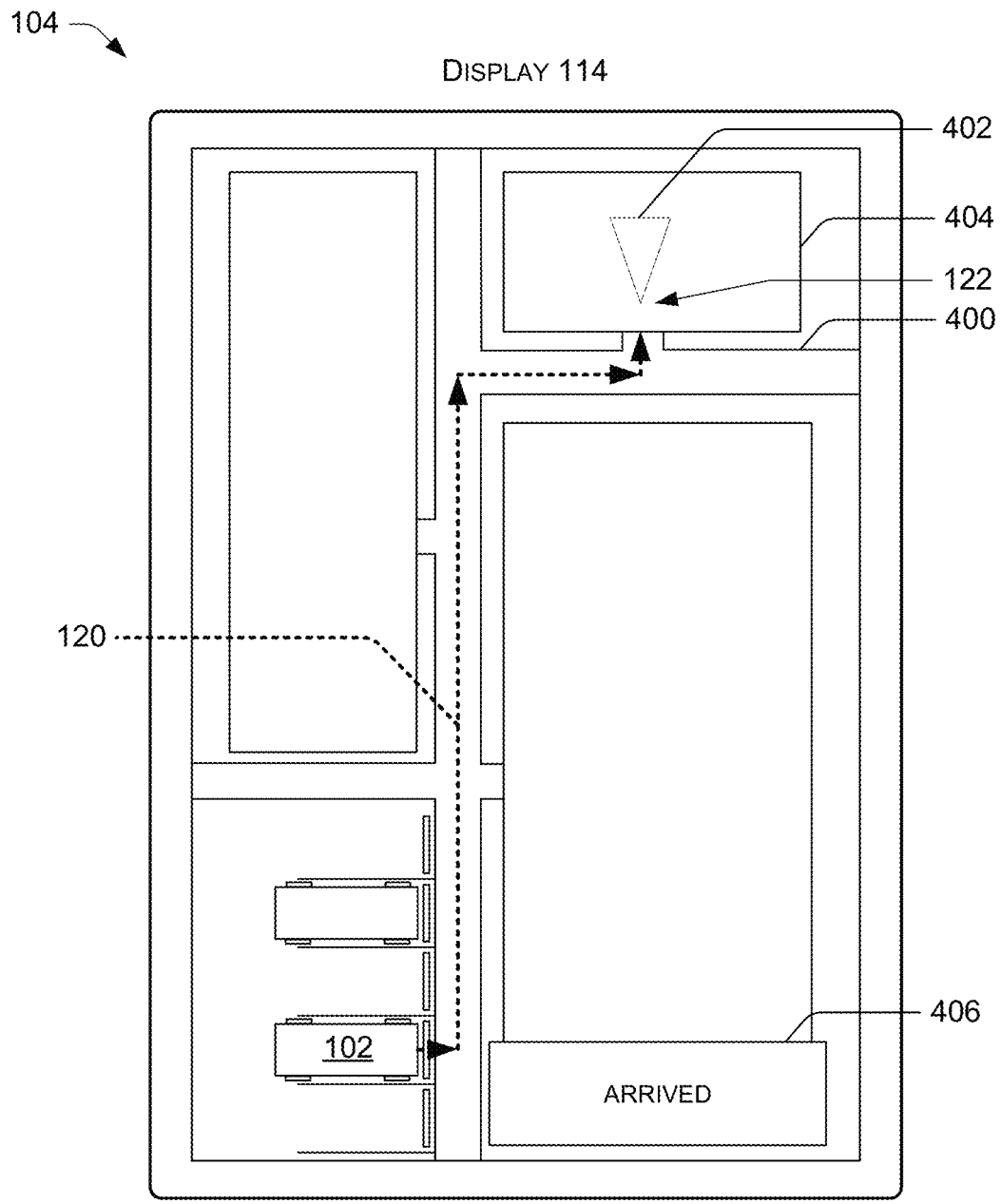
FIG. 4 illustrates an example display augmenting a portion of an example delivery route, according to an embodiment of the present disclosure.

FIG. 4 illustrates a presentation on the display 114 during a delivery within an apartment complex, business complex, strip mall, and so forth. In some instances, as compared to presenting a street view of the delivery location 122 upon arrival or upon completing the first portion 118, for complexes, an aerial view may be shown. For example, in FIG. 4, the display 114 may present an image associated with an aerial view of an apartment complex. In some instances, the images presented may be received from the remote system 100.

Additionally, the view illustrated in FIG. 4 may represent a presentation on the delivery device 104 after the delivery personnel 106 has parked. For example, a similar presentation as "2" may be displayed on the delivery device 104 and upon parking, the presentation in FIG. 4 may be shown. However, noted above, compared to the street view of the delivery location 122 being displayed, the aerial view may be shown. This may allow the delivery personnel to easily navigate with the apartment complex for delivering the parcel 112 to the delivery location 122.

The aerial view is shown being augmented with the second portion 120 of the delivery route 116. In some instances, the second portion 120 may follow sidewalks 400 within the apartment complex. The second portion 120 may also indicate when the delivery personnel is to maneuver or change direction (e.g., turn right, go straight, etc.). Additionally, as shown, the second portion 120 may be determined between the parking location of the delivery vehicle 102 and the delivery location 122. As such, the remote system 100 and/or the delivery device 104 may determine some or all of the second portion 120 as the second portion 120 may be dependent upon the parking location of the delivery vehicle 102.

The display 114 may also present a representation 402 of the delivery location 122. As shown in FIG. 4, the delivery location 122 may be located within a distant building 404 and the delivery personnel 106 may follow the sidewalks 400, along the second portion 120, for delivering the parcel 112. Upon arrival, the delivery personnel 106 may provide an indication of the delivery, such as pressing an arrived icon 406. Additionally, within multi-building complexes, such as that shown in FIG. 4, various instructions may be presented to the delivery personnel 106, such as gate codes and/or mail rooms.

Figure 5A:
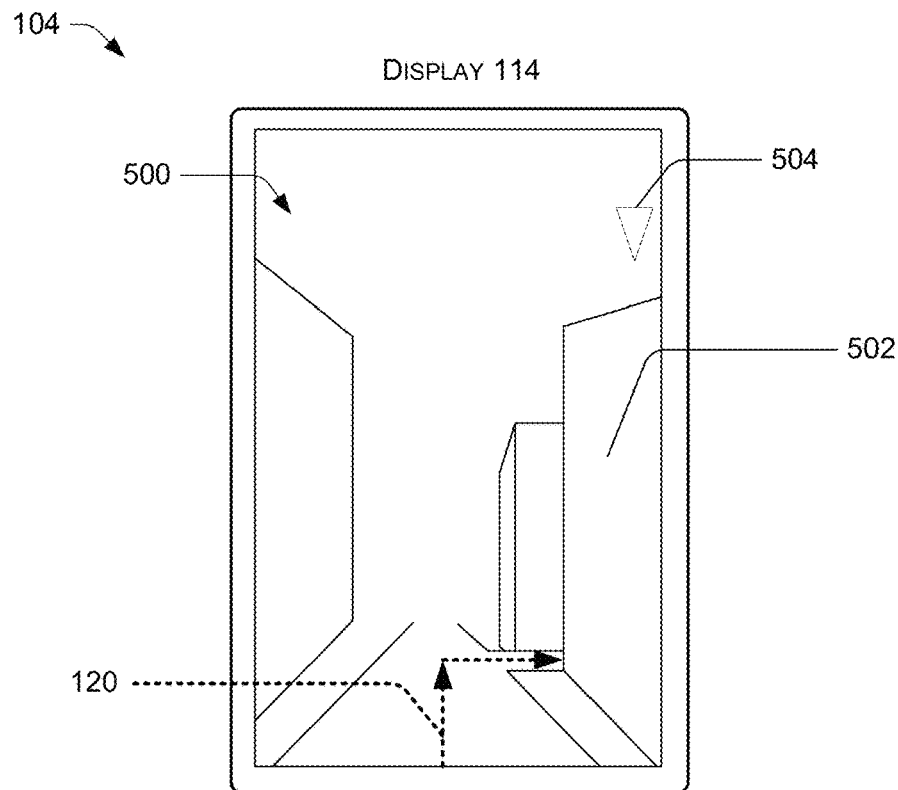
FIG. 5A illustrates an example display augmenting an example delivery route of FIG. 5A, according to an embodiment of the present disclosure.
Figure 5B:
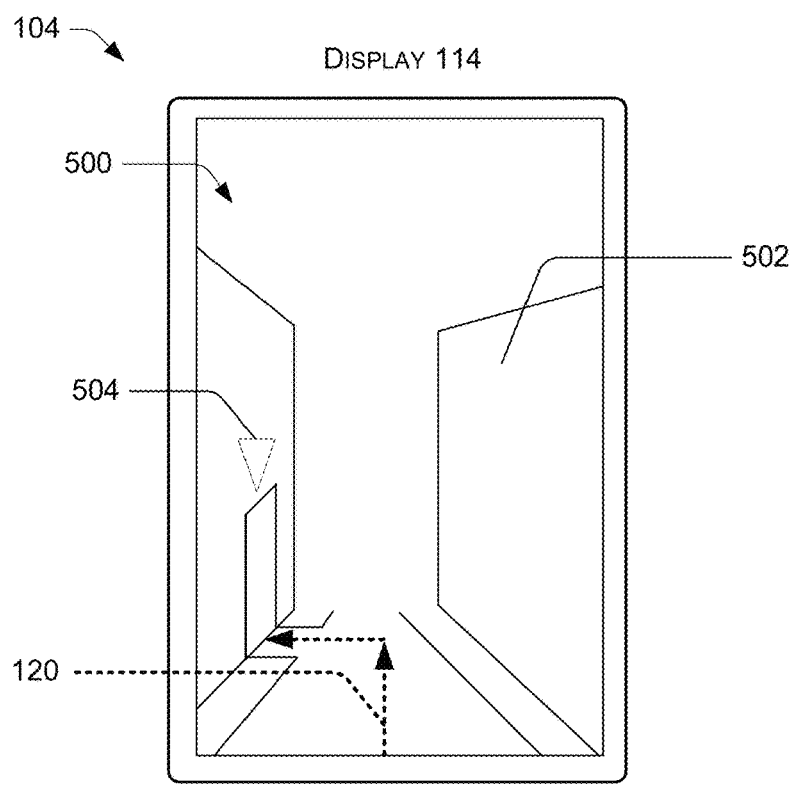
FIG. 5B illustrates an example display augmenting a second portion of the delivery route, according to an embodiment of the present disclosure.

FIGS. 5A and 5B illustrate presentations on the display 114 during a delivery within an apartment complex, business complex, strip mall, and so forth. In some instances, as compared to presenting an aerial view, such as that in FIG. 4, images captured by the wearable camera 132 of the wearable device 108 may be presented on the display 114. For example, during a previous delivery to the delivery location 122, or another delivery location proximal to the delivery location 122, the wearable camera 132 may capture images of the environment (or along the second portion 120 of the delivery route 116). These image(s) may be transmitted from the remote system 100 to the delivery device 104 for display and in conjunction with the second portion 120 of the delivery route 116. Additionally, or alternatively, the image(s) may be received by the delivery device 104 and from the wearable device 108 on a continuous basis for presenting real-time imagery.

In some instances, the view illustrated in FIG. 5A may represent a presentation on the delivery device 104 after the delivery personnel 106 has parked and begins the second portion 120. For example, a similar presentation as "2" may be displayed on the delivery device 104 and upon parking, the presentation in FIG. 5A may be shown. As shown, the display 114 may present the second portion 120 of the delivery route 116 and an image representing an environment 500 along the second portion 120. The environment 500 is shown including buildings 502 around the delivery personnel 106 and walkways used by the delivery personnel 106. The second portion 120 is further shown displayed with indicators (e.g., arrows) as to a direction the delivery personnel 106 is to make and/or maneuvers to be made by the delivery personnel 106 (e.g., turn right). The display 114 is further shown including a representation 504 associated with the delivery location 122. The representation 504 may be displayed vertically above the delivery location 122 to orient the delivery personnel 106 within the environment 504 for easily indicating a location corresponding to the delivery location 122.

In some instances, and as shown in FIG. 5A, only a part of the second portion 120 may be displayed. For example, some parts of the second portion 120 may be obstructed by the buildings 502 or other structures within the environment 500. However, as the delivery personnel 106 travels along the second portion 120, and additional parts of the second portion 120 become unobscured, those parts may be displayed along with updated images of the environment 500. For example, in FIG. 5B, the display 114 may present a second image of the environment 500. In some instances, the second image may be received from the remote system 100, and the delivery device 104 may cause display of the second image based on the delivery personnel 106 completing certain parts of the second portion 120. For example, as the delivery personnel 106 turns, pivots, crosses certain geographical triggers, the second image may be displayed. This succession of images may assist the delivery personnel 106 making deliveries by augmenting the delivery route 116 within the environment 500. Additionally, although two images are shown being displayed, the display 114 may present more image(s) (e.g., a third image upon arriving at the delivery location 122).

As discussed above, as the delivery personnel 106 travels along the second portion 120, the wearable camera 132 may capture the image data 260 for use in determining pathways within the environment 500. In some instances, the image data 260 may be analyzed (e.g., segmented, object detection, etc.) for determining the pathways (e.g., the pathway data 262). The image data 260 may be transmitted to the remote system 100, the delivery device 104, and/or the delivery vehicle 102 for use in instructing delivery personnel 106 in future instances. For example, updated second portions 120 in which the delivery personnel 106 is to walk may be determined. Additionally, the location of the delivery device 104 may be determined as the delivery personnel 106 travels along the second portion 120. The location of the delivery device 104 may be fused with the image data 260 for knowing the geographical locations of the pathways within the environment 500. Moreover, the image data 260 as captured by the wearable device 108 may be used in subsequent deliveries to the delivery location 122 and/or nearby delivery locations for augmenting delivery routes 116.

FIGS. 6-11 illustrate various processes related to augmenting delivery routes 116. The processes described herein are illustrated as collections of blocks in logical flow diagrams, which represent a sequence of operations, some or all of which may be implemented in hardware, software, or a combination thereof In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted.

Any number of the described blocks may be combined in any order and/or in parallel to implement the process, or alternative processes, and not all of the blocks need be executed. For discussion purposes, the processes are described with reference to the environments, architectures, devices, and systems described in the examples herein, such as, for example those described with respect to FIGS. 1-5B, although the processes may be implemented in a wide variety of other environments, architectures, devices, and systems.

Figure 6:
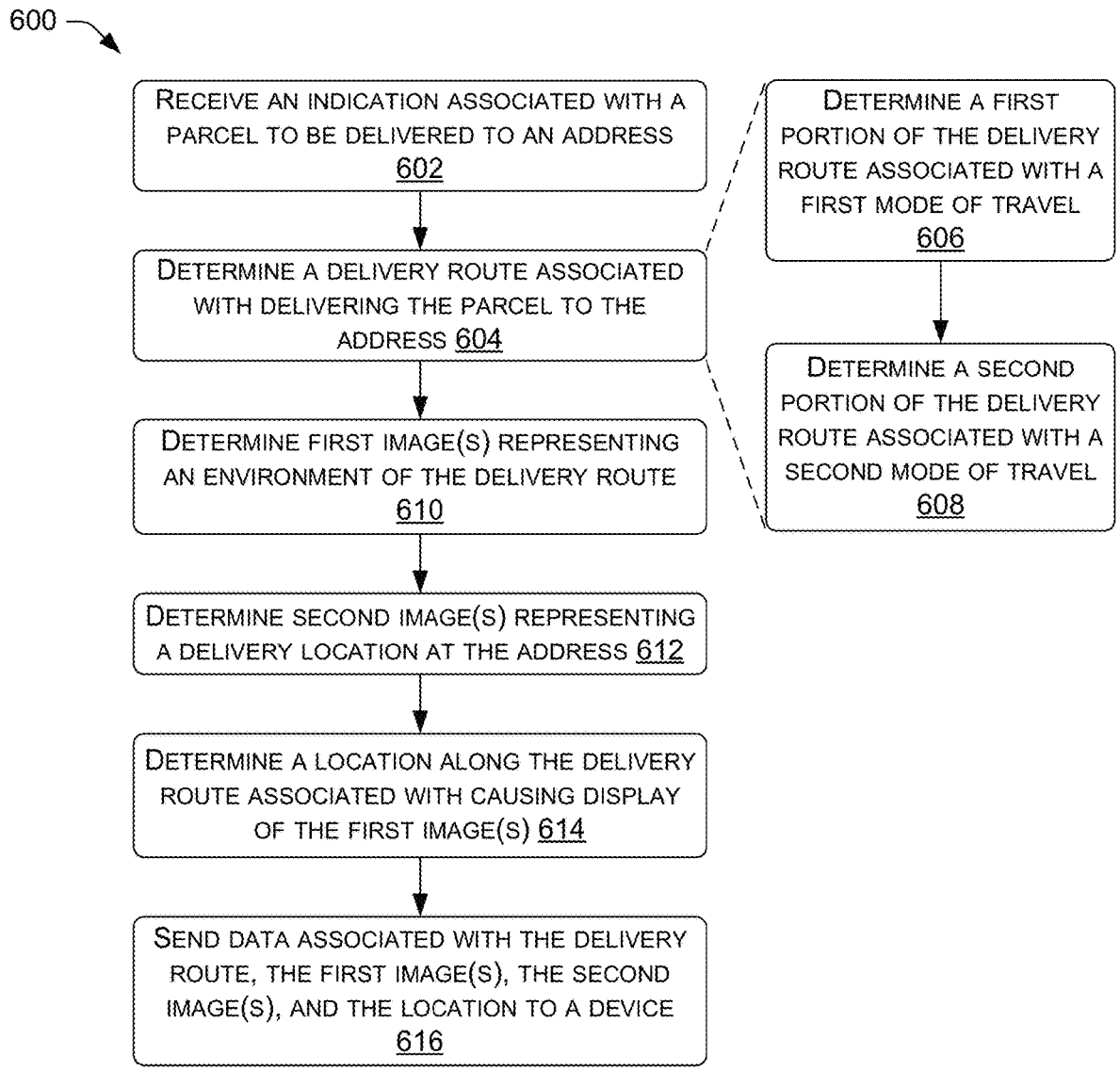
FIG. 6 illustrates an example process for determining a delivery route, and images to display along the delivery route, according to an embodiment of the present disclosure.

FIG. 6 illustrates an example process 600 for determining a delivery route 116 associated with a delivery and content for augmenting the delivery route 116.

At 602, the process 600 may include receiving an indication associated with a parcel to be delivered for an address. For example, the remote system 100 may receive an indication that a parcel 112 is to be delivered to an address. In some instances, the remote system 100 may include components that receive indications of orders from a retailer, or online marketplace, and fulfills and ships the orders to customers. Such components may also parse or extract different segments of the order to determine the address like building number, street name, locality, etc. (e.g., named entity recognition). As part of this process, the components may fulfill an order and store an indication of the orders and/or parcels in the parcel database 206, which indicates the parcels 112 to be shipped.

At 604, the process 600 may include determining a delivery route associated with delivering the parcel to the address. For example, the remote system 100, using the delivery route component 204 and/or the mapping component 212, may determine the delivery route 116 along which the delivery personnel 106 is to travel for delivering the parcel 112. Using a starting location (e.g., delivery hub, previous address, etc.), the remote system 100 may determine the delivery route 116. As part of this process, the remote system 100 may determine which portions of the delivery route 116 are to be completed using different modes of travel (e.g., driving, walking, biking, etc.).

The operation 604 is shown including sub-operations 606 and 608 associated with determine the respective portions of the delivery route 116. For example, at 606 the process 600 may include determining a first portion of the delivery route associated with a first mode of travel. In some instances, the first portion 118 of the delivery route 116 may represent part of the delivery route 116 in which the delivery personnel 106 is to drive the delivery vehicle 102 along roads, streets, bypasses, etc. The first portion 118 of the delivery route 116 may be determined via the mapping component 212 accessing the map database 214 for knowing the portions of the delivery route 116 that may be driven. Additionally, the first portion 118 may be determined through accessing the delivery route database 210 which indicates previous delivery routes 116 (or portions thereof) that were driven.

At 608 the process 600 may include determining a second portion of the delivery route associated with a second model of travel. For example, in some instances, the delivery route 116 may include the second portion 120 in which the delivery personnel 106 is to walk along sidewalks, stairs, walkways, etc., or access via foot (e.g., escalator, elevator, stairs, etc.). The second portion 120 of the delivery route 116 may be determined via the mapping component 212 accessing the map database 214 for knowing portions of the delivery route 116 that may be walked. Additionally, the second portion 120 may be determined through accessing the delivery route database 210 which indicates previous delivery routes 116 (or portions thereof) that were walked.

At 610, the process 600 may include determining first image(s) representing an environment of the delivery route. For example, using the delivery route 116, or locations associated with the delivery route 116, the process 600 may determine image(s) of the environment along the first portion 118 of the delivery route 116. In some instances, the remote system 100 may have access to a plurality of image(s) along the first portion 118 of the delivery route 116. For example, the first image(s) may be captured by the vehicle camera 130 of the delivery vehicle 102, vehicle cameras of other delivery vehicles, and/or other devices. Among the plurality of image(s) in the image database 220, the remote system 100 may determine the first image(s) based on certain factors. For example, some images of the environment may be better quality (e.g., less pixelated) and/or the image may itself not clearly represent the delivery location (e.g., dark conditions, inclement weather, etc.). In such instances, the remote system 100 may select the first image(s) having the highest ratings, the highest quality, and so forth.

In some instances, the remote system 100 may determine a plurality of first image(s) for presenting along the delivery route. For example, the plurality of images may be taken from different vantage points or different proximities to the delivery location 122. Here, the plurality of first image(s) may be presented in succession as the delivery personnel 106 approaches the delivery location 122. Moreover, in some instances, the delivery personnel 106 may depart from the delivery route 116, as instructed, and approach the delivery location 122 from a different bearing. In some instances, the remote system 100 may determine multiple images of the environment and depending on which direction the delivery personnel 106 approaches the delivery location 122, the delivery device 104 may display a corresponding image.

At 612, the process 600 may include determining second image(s) representing a delivery location at the address. For example, the remote system 100 may determine a destination of the delivery and may access the image database 220 to determine an image that represents the delivery location 122. In some instances, this may include an image of a storefront, an image of a residential address, an image of a building, and so forth. The image of the delivery location 122, or more generally the address, may serve to indicate a physical location of the delivery location 122 at the address. In some instances, the remote system 100 may determine a plurality of second image(s) for presenting in succession as the delivery personnel 106 approaches the delivery location 122. This may, for example, be caused in part by the delivery personnel 106 crossing certain geographical triggers.

At 614, the process 600 may determine a location along the delivery route associated with causing display of the first image(s). In some instances, the location may be associated with a threshold distance within the address (or delivery location 122) and/or a threshold time to the address (or delivery location 122). As the delivery personnel 106 passes the location (or crosses a geographical trigger associated with the location), the delivery device 104 may display the first image(s). In some instances, the location may be determined based on a location of the address and/or characteristics of the address. For example, in highly congested areas, the image data 250 may be displayed 100 yards from the address, as compared to a less congested area, were the image data 250 may be displayed 50 yards from the address. In this scenario, presenting the first image(s) sooner may assist the delivery personnel 106, in advance and with enough time, to locate the address and orient the delivery personnel 106 within the environment.

At 616, the process 600 may include sending data associated with the delivery route, the first image(s), the second image(s), and the location to a device. For example, the remote system 100 may send data associated with the delivery route 116, image data of the delivery route 116 (along the first portion 118), image(s) of the address, and the location to the delivery device 104. In some instances, this data may be received as part of the itinerary of the delivery personnel 106. Additionally, the data may be received with instructions indicating when to cause display of the delivery route 116 and the image data, respectively. For example, as part of a delivery, the display 114 may present the delivery route 116 and when the delivery device 104 comes within the threshold 222 (or crosses the location), the delivery device 104 the first image(s) representing the environment Additionally, the instructions may include when the delivery device 104 is to display the image representing the address. For example, the remote system 100 may instruct the delivery device 104 to display the image representing the address when the delivery device 104 receives an indication that the delivery personnel 106 has arrived at the address, has completed the first portion 118 (e.g., the driving portion), and has stopped the delivery vehicle 102. In some instances, the delivery device 104 may store the data in the memory 232, or within a cache. As such, along the delivery route 116, the delivery device 104 may have access to information for augmenting display of the delivery route 116.

Although the process 600 includes the sending of data associated with a single delivery to the address, the process 600 may send additional data associated with other deliveries to additional addresses. This may, in some instances, be included within the itinerary data 226 sent to the delivery device 104. Additionally, in such instances, the delivery device 104 may present the delivery routes 116 to the different addresses in succession and upon completion of the delivery routes 116 associated with respective deliveries.

Figure 7:
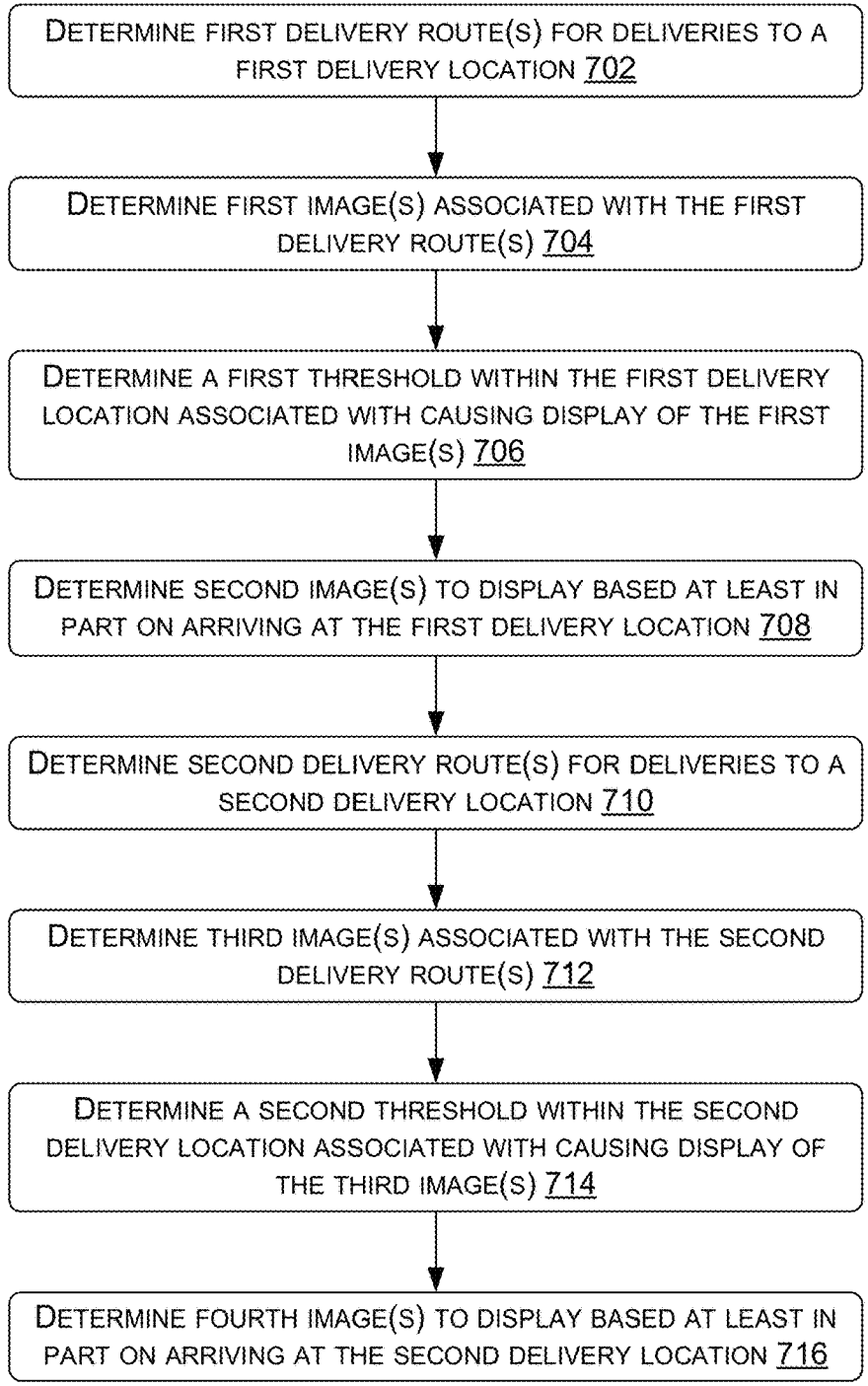
FIG. 7 illustrates an example process for determining delivery routes, images to display along the delivery route, and locations along the delivery route at which to display the images, according to an embodiment of the present disclosure.

FIG. 7 illustrates an example process 700 for determining the delivery routes 116 to addresses and when to augment the delivery routes 116.

At 702, the process 700 may include determining first delivery route(s) for deliveries to a first delivery location. For example, the remote system 100 may determine, using the delivery route component 204 and/or the mapping component 212, the first delivery route(s). In some instances, the delivery personnel 106 may take different delivery routes 116 when traveling to the first delivery location. That is, the delivery locations 122 may include different, or multiple, route(s). For example, the delivery personnel 106 may approach the first delivery location from a first direction (and bearing) or a second direction (and bearing). Depending upon the direction of arrival, or a direction of travel to the first delivery location, the delivery routes 116 may be different.

At 704, the process 700 may include determining first image(s) associated with the first delivery route(s). For example, the remote system 100 may access the image database 220 to determine image(s) previously captured along the first delivery route(s), or which represent the first portion 118 of the first delivery route(s). For example, depending upon the first delivery route(s), and which delivery route the delivery personnel 106 takes to the first delivery location, different image(s) of the environment along the first delivery route(s) may be presented. As an example, if the delivery personnel 106 approaches the first delivery location from a first location and a first bearing, an image of the environment from that location and bearing may be presented. Alternatively, if the delivery personnel 106 approaches the first delivery location from a second location and a second bearing, an image of the environment from that location and bearing may be presented. Accordingly, for each of the first delivery route(s), the process 700 may determine corresponding image(s) of the environment. Moreover, in some instances, the process 700 may determine multiple image(s) to present in succession as the delivery personnel 106 approaches the first delivery location. The first image(s) may be previously captured by the vehicle camera 130 of the delivery vehicle 102, other delivery vehicles, and/or other devices.

At 706, the process 700 may include determining a first threshold within the first delivery location associated with causing display of the first image(s). In some instances, the first threshold may be associated with a threshold location within the first delivery location or a time threshold within the first delivery location. Additionally, or alternatively, the first threshold may correspond to a geographical trigger at which to display the first image(s). As the delivery personnel 106 comes within the first threshold, the delivery device 104 may output the first image(s) of the environment, along the delivery route 116. The first image(s) of the environment may also be presented alongside portions of the first delivery route. For example, the first portion 118 and/or the second portion 120 of the first delivery route may be superimposed on the first image(s) of the environment.

At 708, the process 700 may include determining second image(s) to display based at least in part on arriving at the first delivery location. For example, the remote system 100 may access the image database 220 to determine image(s) representing the first delivery location. The second image(s) may represent a front of the household, for example. Additionally, in some instances, the second image(s) may include multiple image(s) associated with the direction of travel to the first delivery location and/or depending on where the delivery personnel 106 parks (or stops) at an address associated with the delivery location 122. For example, the image database 220 may include multiple image(s) of the first delivery location, where the multiple image(s) are taken from different perspectives of the first delivery location and/or different locations relative to the first delivery location. For example, if the delivery vehicle 102 parks directly in front of the first delivery location, on the street, a first image of the first delivery location may be presented. However, if the delivery vehicle 102 parks at a different location, a second image of the first delivery location may be presented. For example, another vehicle may be parked directly in front of the first delivery location and the delivery vehicle 102 may park in front of or behind the other delivery vehicle 102. In such instances, the remote system 100 may determine a plurality of second image(s) for which the delivery device 104 may display, and based on the location of the delivery vehicle 102 parking at the first delivery location.

At 710, the process 700 may include determining second delivery route(s) for deliveries to a second delivery location. For example, the remote system 100 may determine, using the delivery route component 204 and/or the mapping component 212, the second delivery route(s). In some instances, the delivery personnel 106 may take different delivery routes 116 when traveling to the second delivery location. Depending upon the direction of arrival (or bearing), or a direction of travel to the second delivery location, the delivery routes 116 may be different.

At 712, the process 700 may include determining third image(s) associated with the second delivery route(s). For example, the remote system 100 may access the image database 220 to determine image(s) previously captured along the second delivery route, or which represent the first portion 118 of the second delivery route(s). For example, depending upon the second delivery route(s), and which delivery route the delivery personnel 106 takes to the second delivery location, different image(s) of the environment along the second delivery route(s) may be presented. As an example, if the delivery personnel 106 approaches the second delivery location from a first location and a first bearing, an image of the environment from that location and bearing may be presented. Alternatively, if the delivery personnel 106 approaches the second delivery location from a second location and a second bearing, an image of the environment from that location and bearing may be presented. Accordingly, for each of the second delivery route(s), the process 700 may determine corresponding image(s) of the environment. Moreover, in some instances, the process 700 may determine multiple image(s) to present in succession as the delivery personnel 106 approaches the second delivery location. The third image(s) may be previously captured by the vehicle camera 130 of the delivery vehicle 102, other delivery vehicles, and/or other devices.

At 714, the process 700 may include determining a second threshold within the second delivery location associated with causing display of the third image(s). In some instances, the second threshold may be associated with a threshold location within the second delivery location or a time threshold within the second delivery location. Additionally, or alternatively, the second threshold may correspond to a geographical trigger at which to display the third image(s). As the delivery personnel 106 comes within the second threshold, the delivery device 104 may output the third image(s) of the environment, along the delivery route 116. The third image(s) of the environment may also be presented alongside portions of the second delivery route. For example, the first portion 118 and/or the second portion 120 of the second delivery route may be superimposed on the third image(s) of the environment.

At 716, the process 700 may include determining fourth image(s) to display based at least in part on arriving at the second delivery location. For example, the remote system 100 may access the image database 220 to determine image(s) representing the second delivery location. The fourth image(s) may represent a delivery bay for a business, for example. Additionally, in some instances, the fourth image(s) may include multiple image(s) associated with the direction of travel to the second delivery location and/or depending on where the delivery personnel 106 parks (or stops) at the second delivery location. For example, the image database 220 may include multiple image(s) of the second delivery location, where the multiple image(s) are taken from different perspectives of the second delivery location and/or different locations relative to the second delivery location. In such instances, the remote system 100 may determine a plurality of image(s) for which the delivery device 104 may display, and based on the location of the delivery vehicle 102 parking at an address associated with the second delivery location.

Although the process 700 illustrates determining delivery routes, thresholds, and image data to display for two delivery locations, the process 700 may repeat for any number of deliveries to different delivery locations. Additionally, data associated with the delivery routes 116, or deliveries for a delivery personnel 106 throughout the course of a day, may be sent to the delivery device 104 according to a predetermined schedule (e.g., daily, hourly, etc.).

Figure 8:
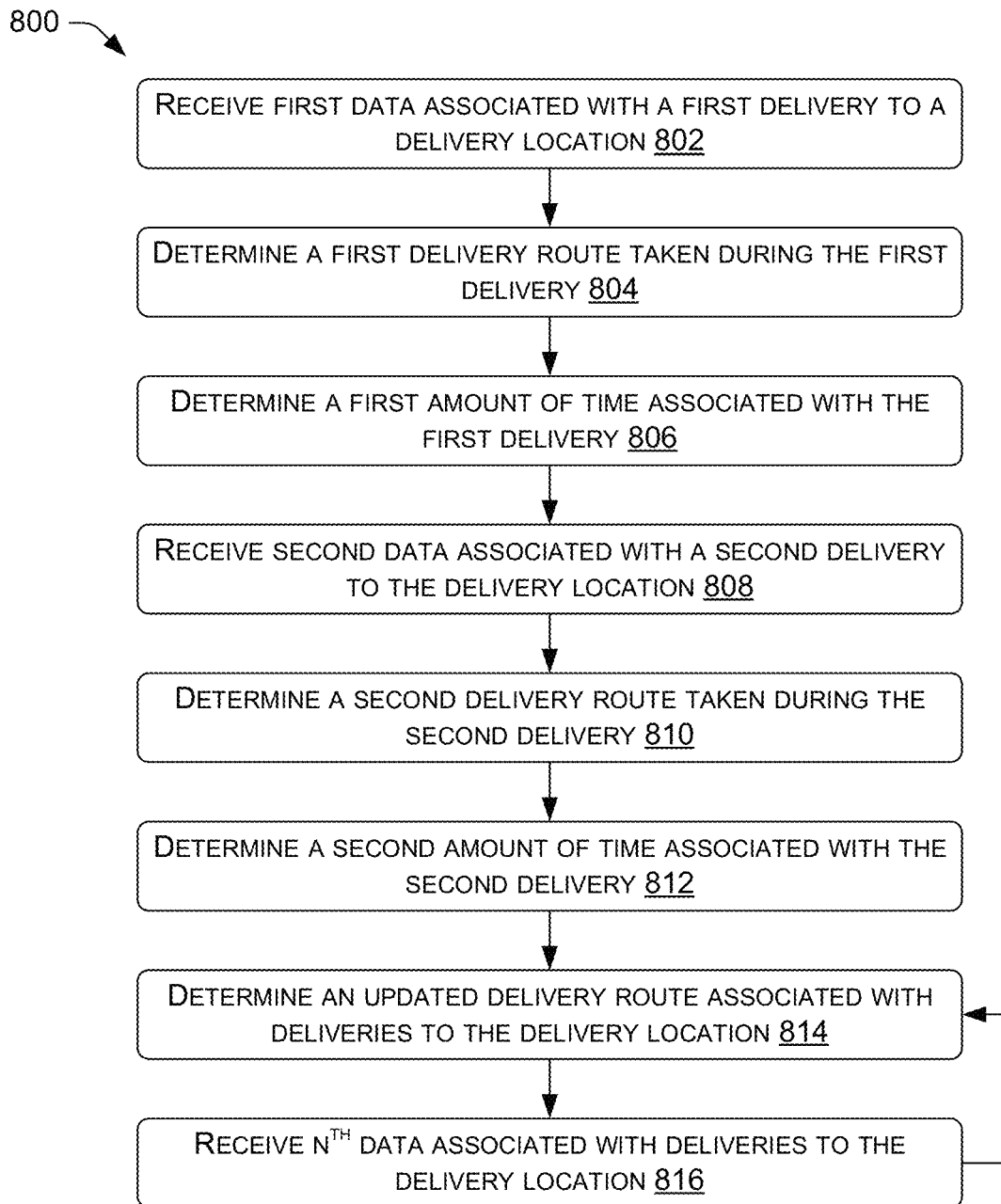
FIG. 8 illustrates an example process for optimizing delivery routes, according to an embodiment of the present disclosure.

FIG. 8 illustrates an example process for receiving data associated with delivery routes 116 and updating delivery routes 116.

At 802, the process 800 may include receiving first data associated with a first delivery to a delivery location. For example, the remote system 100 may receive, from the delivery vehicle 102, the delivery device 104, and/or the wearable device 108, information associated with a delivery to the delivery location 122. In some instances, the information may include, but is not limited to, a parking location of the delivery vehicle 102 at the address associated with the delivery location 122, a time associated with parking at the address 2, an amount of time stopped at the address, a route taken by the delivery personnel 106 during the delivery, whether driven or walked, image data captured by the vehicle camera 130 along the delivery route 116 (e.g., the first portion 118), image data of the delivery location 122 as captured by the wearable camera 132, and/or image data associated with pathways adjacent to or on the premise at the delivery location 122 as captured by the wearable camera 132 (e.g., the second portion 120). In such instances, this or other information may be captured by camera(s), location component(s) (e.g., GPS), microphones, etc. of the delivery vehicle 102, the delivery device 104, and/or the wearable device 108. In some instances, the first data may be received individually from the delivery vehicle 102, the delivery device 104, and/or the wearable device 108, respectively, according to predetermined schedules (e.g., every minute) or based upon certain indicators (e.g., delivering the parcel 112). The first data may be utilized for optimizing delivery routes 116 associated with deliveries to the delivery location 122. Moreover, image(s) captured by the vehicle camera 130 (along the first portion 118) and the wearable camera 132 (along the second portion 120) may be stored within the image database 220. These image(s) may be used in future instances when making deliveries to the delivery location 122 or adjacent delivery location.

At 804, the process 800 may include determining a first route taken during the first delivery. For example, based on receiving the first data, the remote system 100 may determine portions of the first delivery route that the delivery personnel 106 drove, walked, biked, and so forth. In some instances, the remote system 100 may determine the first portion 118 and the second portion 120, for example, as part of receiving location data and/or image data from the delivery device 104, the delivery vehicle 102, and/or the wearable device 108. Moreover, in some instances, the delivery personnel 106 may deviate from the delivery route 116 provided. That is, the delivery personnel 106 may take a different delivery route 116 than instructed. As such, the location of the delivery personnel 106 along the different portions of the delivery route 116 may be tracked and recorded.

At 806, the process 800 may include determining a first amount of time associated with the first delivery. For example, based at least in part on the first data, the remote system 100 may determine an amount of time it took for the delivery personnel 106 to make the first delivery. In some instances, the remote system 100 may determine an amount of time it took for the delivery personnel 106 to complete the first portion 118 (e.g., driving) and/or an amount of time it took for the delivery personnel 106 to complete the second portion 120 (e.g., walking). In some instances, times stamps associated with the delivery personnel 106 beginning the first portion 118, completing the first portion 118 (e.g., stopping, parking, etc.), beginning the second portion 120, and completing the second portion 120 (e.g., scanning package, delivering package, etc.) may be used to determine the amount of time associated with the first delivery.

At 808, the process 800 may include receiving second data associated with a second delivery to the delivery location. For example, the remote system 100 may receive, from the delivery vehicle 102, the delivery device 104, and/or the wearable device 108, information associated with a delivery to the delivery location 122. In some instances, the second data received at 808 may be received after the first data at 804. Moreover, the second data may be received from a delivery device, delivery vehicle, and/or wearable device associated with a different delivery personnel 106, or a delivery device, delivery vehicle, or wearable device associated with the same delivery personnel 106. For example, a fleet of delivery personnel 106 may be used for making the deliveries. In some instances, the second data may include information similar to the first data, such as a time of completing the delivery, a route taken by the delivery personnel 106 during delivery, image data of the delivery location 122 as captured by the wearable camera 132, image data captured by the vehicle camera 130 along the delivery route 116 (e.g., the first portion 118), and so forth. In some instances, the first data may be received individually from the delivery vehicle 102, the delivery device 104, and/or the wearable device 108 according to predetermined schedules (e.g., every minute) or based upon certain indicators (e.g., delivery the parcel 112). Moreover, image(s) captured by the vehicle camera 130 (along the first portion 118) and the wearable camera 132 (along the second portion 120) may be stored within the image database 220. These image(s) may be used in future instances when making deliveries to the delivery location 122.

At 810, the process 800 may include determining a second route taken during the second delivery. For example, based on receiving the second data, the remote system 100 may determine portions of the second delivery route that the delivery personnel 106 drove, walked, biked, and so forth. In some instances, the remote system 100 may determine the first portion 118 and the second portion 120, for example, as part of receiving location data and/or image data from the delivery vehicle 102, the delivery device 104, and/or the wearable device 108. Moreover, in some instances, the delivery personnel 106 may deviate from the delivery route 116 provided to the delivery personnel 106 and the location of the delivery personnel 106 along the different portions of the delivery route 116 may be tracked and recorded.

At 812, the process 800 may determine a second amount of time associated with the second delivery. For example, based at least in part on the second data, the remote system 100 may determine an amount of time it took for the delivery personnel 106 to make the second delivery. In some instances, the remote system 100 may determine an amount of time it took for the delivery personnel 106 to complete the first portion 118 (e.g., driving) and an amount of time it took for the delivery personnel 106 to complete the second portion 120 (e.g., walking).

At 814, the process 800 may include determining an updated delivery route associated with deliveries to the delivery location. For example, the remote system 100 may determine the updated delivery route by comparing the first delivery route and the second delivery route, as well as the amount of time associated with completing the first delivery and the second delivery, respectively. In some instances, portions of the first delivery route and the second delivery route may be the same and/or different. For example, a first delivery personnel may take the first delivery route and a second delivery personnel may take the second delivery route. The remote system 100 may determine which portions of the delivery routes were most efficient, or which took the least amount of time. By way of example, envision that an apartment complex includes a plurality of walkways between different buildings. The first delivery route through the apartment complex may result in a faster delivery, as compared to the second delivery route through the apartment complex. By comparing the first delivery route and the second delivery route, as well as the times associated with completing respective portions, the remote system 100 may determine the delivery route that took the least amount of time. The updated delivery route may be stored by the remote system 100 within the delivery route database 210 for use in future instances when making deliveries to the delivery location 122. In some instances, the remote system 100 may utilize a portion of the updated delivery route for making the deliveries determining the delivery routes 116.

At 816, the process 800 may include receiving $n^{th}$ data associated with deliveries to the delivery location. For example, the remote system 100 may continuously receive data associated with deliveries to the delivery location 122. The remote system 100 may continuously optimize or determine an optimized delivery route when making deliveries to the delivery location 122. This constant feedback loop may result in increased deliveries and optimized delivery routes when making deliveries to the delivery location 122 (e.g., time). That is, through constantly receiving feedback, the personal experience of the delivery personnel 106 may indicate more efficient delivery routes. In such instances, the delivery personnel 106 may bypass certain prompted delivery routes 116 and instead rely on their personal knowledge of infrastructure. Overtime, and through tracking the deliveries, the behavior of the delivery personnel 106 may be used to find more efficient delivery routes. Additionally, the process may receive updated image data as captured by the delivery vehicle 102 and/or the wearable device 108. This image data may be stored in the image database 220 for use during subsequent deliveries.

Figure 9:
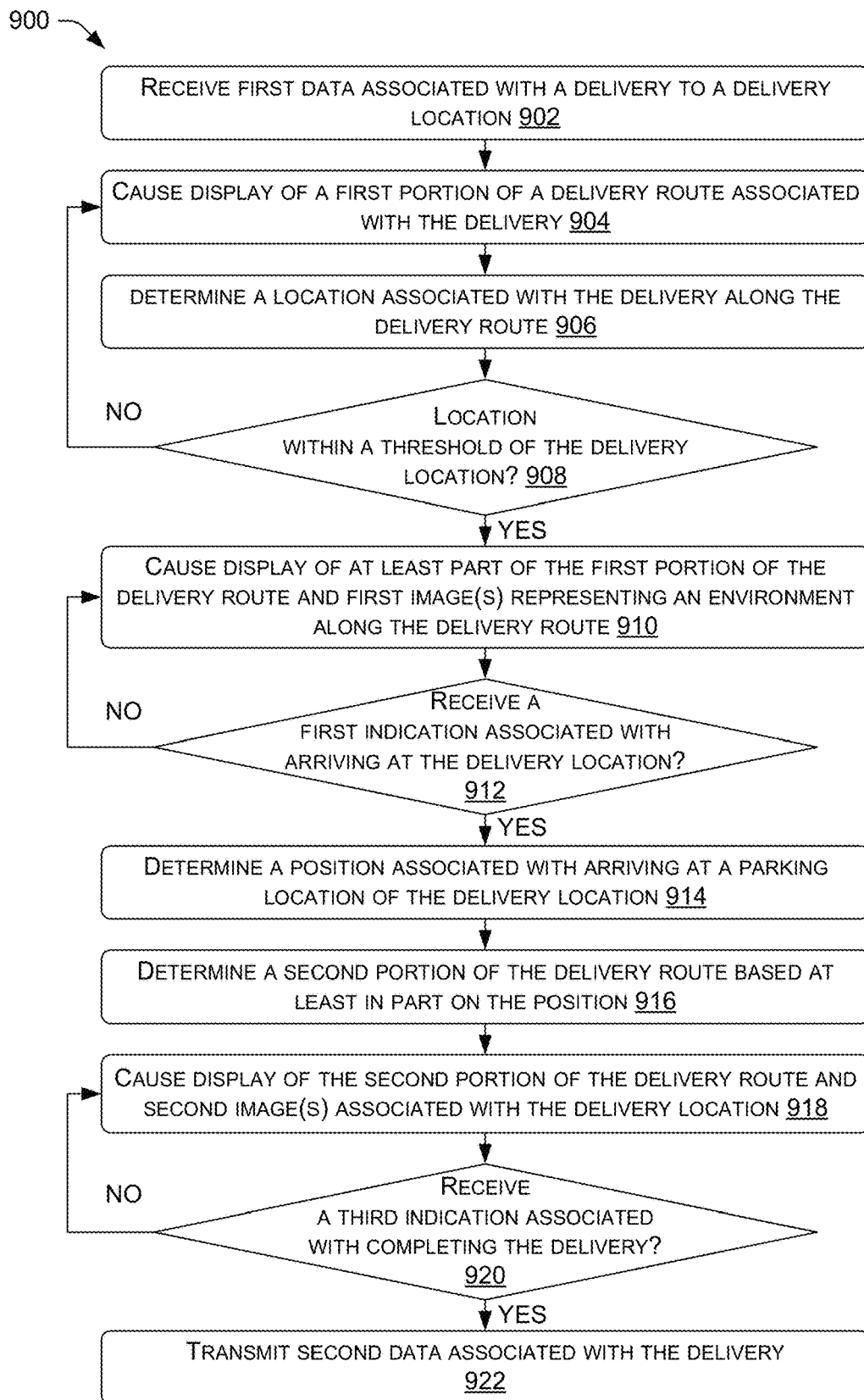
FIG. 9 illustrates an example process for displaying a delivery route and images along the delivery route, according to an embodiment of the present disclosure.

FIG. 9 illustrates an example process 900 for augmenting delivery routes on the delivery device 104.

At 902, the process 900 may include receiving first data associated with a delivery to a delivery location. For example, the delivery device 104 may receive, from the remote system 100, data associated with the delivery. In some instances, the data may include the delivery route 116 (e.g., the first portion 118 and the second portion 120), images of the delivery route 116 (e.g., road, environment, etc.), images of the delivery location 122 (e.g., storefront, house, etc.), an indication when to display image(s) of the delivery route 116, information of the delivery (e.g., recipient, address, etc.), and so forth. In some instances, the first data may be received as part of an itinerary of the delivery personnel 106.

At 904, the process 900 may include causing display of a first portion of a delivery route associated with the delivery. For example, the display 114 of the delivery device 104 may present the first portion 118 along which the delivery personnel 106 is to drive. The first portion 118 may also be represented together with the map data 234 of an environment through which the delivery personnel 106 travels. As such, the delivery route 116 may be presented or indicated on the map corresponding to an environment of the delivery personnel 106.

At 906, the process 900 may include determining a location associated with the delivery along the delivery route. For example, the location may be associated with a location of the delivery vehicle 102, the delivery device 104, the delivery personnel 106, and/or the wearable device 108. In some instances, the process 900 may receive an indication from the delivery vehicle 102, the delivery device 104, and/or the wearable device 108 that represents the location of the delivery vehicle 102, the delivery device 104, and/or the wearable device 108, respectively.

At 908, the process 900 may include determining whether the location is within a threshold of the delivery location. For example, as the delivery personnel 106 comes within a certain threshold of the delivery location 122 (e.g., geographical trigger), the delivery device 104 may display the image(s) of the environment along the first portion 118. The comparison of the location to the threshold 222 may indicate whether the delivery personnel 106 is at, or within, the threshold 222 (e.g., 100 yards) or time (e.g., 10 seconds). In some instances, the threshold 222 may be associated with a geofence around the delivery location 122 and the location of the delivery personnel 106 may be compared against the geofence for determining whether the delivery personnel 106 is within the threshold 222. In some instances, the threshold 222 may be associated with a specific point, or position, along the delivery route 116. If at 908 the process 900 determines that the location is not within the threshold 222, the process 900 may follow the "NO" route and proceed to 904. For example, the delivery device 104 may determine, based on receiving a location from the location component 240, that the delivery device 104 is not within the threshold 222. Alternatively, if at 908 the process 900 determines that the location is at, or within, the threshold 222 the process 900 may follow the "YES" route and proceed to 910.

At 910, the process 900 may include causing display of at least part of the first portion of the delivery route and first image(s) representing an environment along the delivery route. For example, the delivery device 104 may cause the display 114 to present images as previously captured by the vehicle camera 130, vehicle cameras of other delivery vehicles, etc. In some instances, the delivery device 104 may determine which image of the environment to display, based at least in part on a bearing and/or location of the delivery vehicle 102. For example, the delivery device 104 may receive multiple image(s) of the environment representing the delivery route 116 along the first portion 118. The delivery device 104 may select which image to present based on the location and/or bearing. This may cause display of appropriate image data of the delivery personnel 106 for orienting the delivery personnel 106 within the environment and as the delivery personnel 106 approaches the delivery location 122. In such instances, the delivery device 104 may receive multiple image(s) of the delivery route 116 from the remote system 100 and may determine which image(s) to display based on the location and/or bearing.

Additionally, or alternatively, the delivery device 104 may transmit a location and/or bearing to the remote system 100, and in response, the remote system 100 may determine which image of the environment to display. Therein, the remote system 100 may transmit appropriate image(s) to display on the delivery device 104. Moreover, in some instances, the delivery device 104 may display a succession of image(s) as the delivery device 104 approaches the delivery location 122. For example, a first image of the environment may be displayed when the delivery personnel 106 is within a first threshold of the delivery location 122 (or crosses a first geographical trigger) and a second image may be displayed when the delivery personnel 106 is within a second threshold (or crosses a second geographical trigger) of the delivery location 122. This succession of image(s) may represent the delivery personnel 106 traveling closer to the delivery location 122.

In some instances, the display of the image(s) may be within the upper portion 126 of the display 114, and the lower portion 124 may display the delivery route 116 together with a map of the environment. Additionally, in the upper portion 126, the delivery device 104 displays at least a part of the first portion 118 with the image(s) of the environment. This may augment part of the delivery route 116 and the environment, vice versa. Additionally, image(s) of the environment may be augmented with a current location of the delivery personnel 106 along the delivery route 116. This may indicate the current position of the delivery personnel 106 along the delivery route 116 and for use by the delivery personnel 106 in understanding remaining parts of the delivery route 116. Additionally, in some instances, as the delivery personnel 106 nears completion of the first portion 118, the delivery device 104 may display an indication of the second portion 120 on the image(s) of the environment.

At 912, the process 900 may include determining whether a first indication is received associated with arriving at the delivery location. For example, the delivery device 104 may receive an indication associated with the delivery personnel 106 providing input to the parked icon 310. In some instances, the indication may be associated with completing the first portion 118 of the delivery route 116. For example, after the delivery personnel 106 drives to an address or parking location association with the delivery location 122, the delivery personnel 106 may have completed the first portion 118. In some instances, the indication may be received from the location component 240 of the delivery device 104 (or the delivery vehicle 102) for knowing whether the delivery personnel 106 has arrived (e.g., parked). In such instances, the delivery personnel 106 may not provide input the delivery device 104.

If at 912 the process 900 determines that the first indication was not received, the process 900 may follow the "NO" route and proceed to 910. At 910, the process 900 may continue to display image(s) of the environment and portions of the delivery route 116. Alternatively, if at 912 the process 900 determines that the first indication was received, the process 900 may follow the "YES" route and proceed to 914. For example, after arriving at the delivery location 122 and parking on the street, the delivery personnel 106 may touch the parked icon 310.

At 914, the process 900 may include determining a position associated with arriving at a parting location at the delivery location. For example, the position may be associated with a location of the delivery device 104 or the delivery vehicle 102. In some instances, the delivery personnel 106 may park at various locations at the delivery location 122 (or the address). For example, in some instances, despite being instructed to park or drive to a particular location, there may be an obstruction that prevents the delivery personnel 106 from parking at the instructed spot. By way of example, a parked car or garbage can maybe at the location. In such instances, the delivery personnel 106 may park the delivery vehicle 102 at a different location. In doing so, the second portion 120 of the delivery route 116 that the delivery personnel 106 is to walk may change.

At 916, the process 900 may include determining a second portion of delivery route based at least in part on the position. For example, the delivery device 104, such as the mapping component 236, may determine the second portion 120 based on the position and the delivery location 122. For example, envision that the delivery location 122 is the front porch of a house. The delivery device 104 may determine the second portion 120 between the position at which the delivery vehicle 102 parked and a position on the front porch at which the delivery personnel 106 is to make the delivery. In some instances, the delivery device 104 may determine part of the second portion (e.g., based on the updated parking position) and combine part of the second portion 120 as determined by the remote system 100. That is, the delivery device 104 may determine an updated second portion 120. In instances where the delivery personnel 106 is able to stop at the instructed position, the delivery device 104 may not determine the second portion 120, and instead, may present the second portion 120 as received from the remote system 100.

At 918, the process 900 may include causing display of the second portion of the delivery route and second image(s) associated with the delivery location. For example, the delivery device 104 may present, on the display 114, an image of the delivery location 122 (e.g., house, storefront, etc.). In some instances, the delivery device 104 may receive the image(s) of the delivery location 122 from the remote system 100, as part of operation 902. Moreover, in some instances, depending on the position of the delivery personnel 106 arriving at the delivery location 122, an associated image(s) may be presented. For example, the image(s) presented may be chosen based on the orientation and/or location of the delivery personnel 106. Such determination may be made by the remote system 100 or the delivery device 104.

The second portion 120 may be superimposed on the image(s) of the delivery location 122 for augmenting the delivery route 116. This may indicate to the delivery personnel 106 where they are to walk for making the delivery. In some instances, as the delivery personnel 106 walks along the second portion 120, the delivery device 104 may display updated image(s) based on the location of the delivery personnel 106. Moreover, in some instances, the delivery device 104 may receive image(s) from the wearable device 108 for presentation on the delivery device 104 in real-time. In such instances, the image(s) may be augmented with the second portion 120. The delivery personnel 106 may therefore visually observe the delivery route 116 on the delivery device 104, together with image(s) of the delivery location 122. Moreover, in some instances, specific instructions, such as gate codes, may be presented on the display 114.

At 920, the process 900 may include determining whether a third indication is received associated with completing the delivery. For example, upon arriving at the delivery location 122, or completing the second portion 120, the delivery personnel 106 may provide an input to the arrived icon 314. This may indicate that the delivery was successfully made to the delivery location 122 (e.g., dropped off). In some instances, the indication may be received as part of scanning an identifier (e.g., barcode) associated with delivery.

If at 920 the process 900 determines that the third indication has not been received, the process 900 may follow the "NO" route and proceed to 918. At 918, the process 900 may continue to display the second portion 120 (or part thereof) and image(s) of the delivery location 122. Alternatively, if at 920 the process 900 determines that the third indication has been received, the process 900 may follow the "YES" route and proceed to 922.

At 922, the process 900 may include sending second data associated with the delivery. For example, the delivery device 104 may transmit second data that includes a parking location of the delivery vehicle 102 at the delivery location 122, a time associated with parking at the delivery location 122, an amount of time being stopped at the delivery location 122, a route taken by the delivery personnel 106 during delivery, whether driven or walked, image data of the delivery location 122, and/or image data associated with pathways adjacent to or on the premise at the delivery location 122. Moreover, the delivery vehicle 102 may also transmit image data as captured by the vehicle camera 130 while the delivery vehicle 102 travels along the first portion 118 of the delivery route 116.

Although FIG. 9 and the process 900 illustrates the delivery route 116 including the first portion 118 and the second portion 120, some delivery routes 116 may include more than two portions or less than two portions. Additionally, although the process 900 illustrates receiving the first data at a single instance, in some instances, the delivery device 104 may receive the first data at different times. For example, the image(s) of the delivery route 116 may be received at a different time, or instance, as compared to the image(s) of the delivery location 122.

Figure 10:
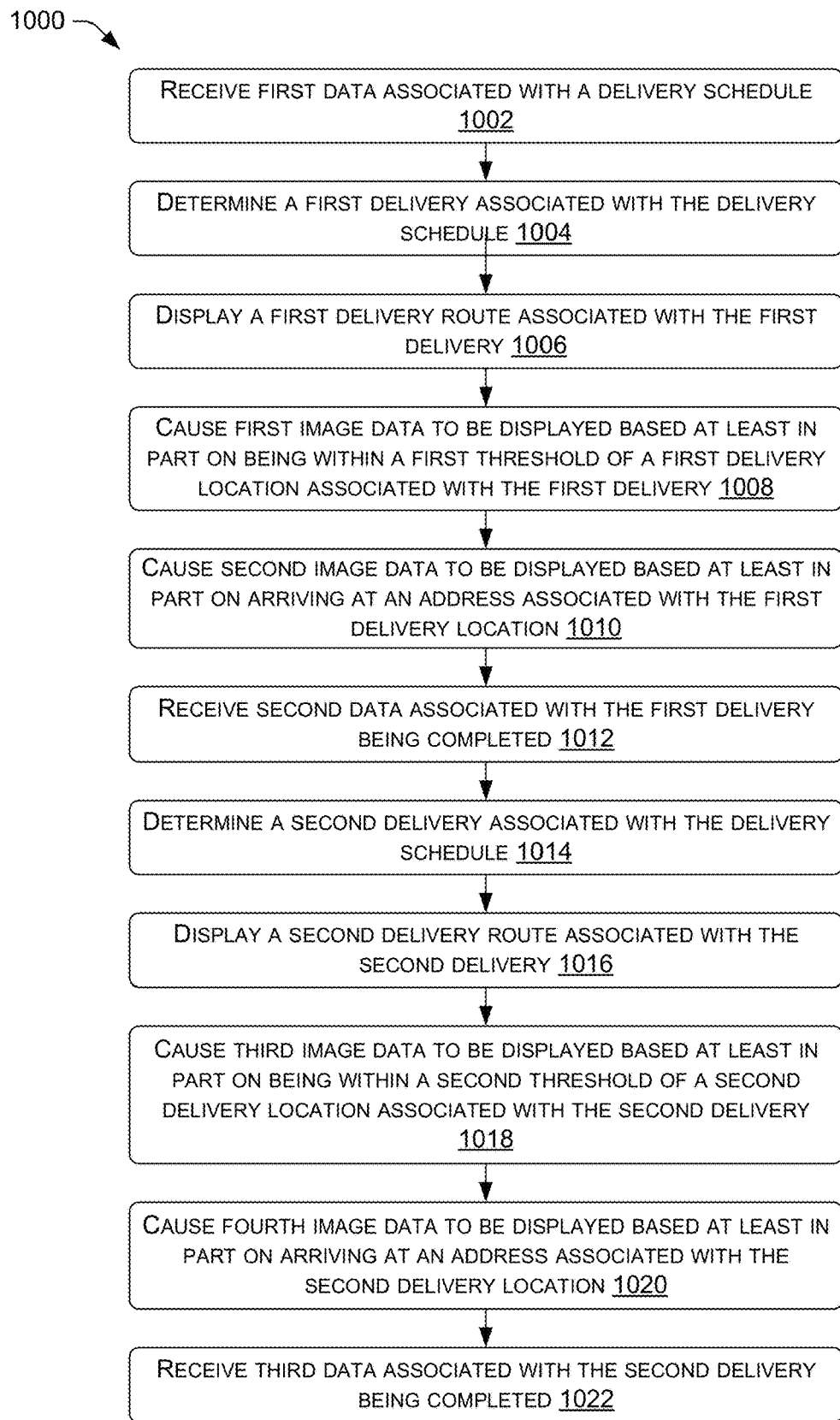
FIG. 10 illustrates an example process for augmenting delivery routes to display, according to an embodiment of the present disclosure.

FIG. 10 illustrates an example process 1000 for augmenting delivery routes for the delivery personnel 106.

At 1002, the process 1000 may include receiving first data associated with a delivery schedule. For example, the delivery device 104 may receive, from the remote system 100, the itinerary data 226 that represents a delivery schedule of the delivery personnel 106. In some instances, the first data may be received at the beginning of a work period (e.g., in the morning) or according to a predetermined schedule. The first data may also include details of the delivery routes 116 the delivery personnel 106 is to take, image data along the delivery route 116 (or of an environment along the delivery route 116), image data of the delivery locations 122, and so forth.

At 1004, the process 1000 may include determining a first delivery associated with the delivery schedule. For example, the delivery device 104 may determine that a first delivery is to a first address, which may correspond to a household, place of business, apartment complex, and so forth. In some instances, the first delivery may be identified as an initial delivery among the delivery schedule.

At 1006, the process 1000 may include displaying a first delivery route associated with the first delivery. For example, the delivery device 104 may present, on the display 114, the first delivery route. In some instances, the first delivery route may be presented together, or in conjunction, with a map of an environment through which the delivery personnel 106 travels during the first delivery.

At 1008, the process 1000 may include causing first image data to be display based at least in part on being within a first threshold of a first delivery location associated with the first delivery. For example, as the delivery personnel 106 approaches the first delivery location, the delivery device 104 may display image(s) of the environment, along the first portion 118 of the delivery route 116. In some instances, the image(s) of the delivery route 116 along the first portion may be received from the remote system 100 at 1002. These image(s) may be displayed with along with portions of the delivery route 116. For example, lines or other presentations of the first portion 118 and/or the second portion 120 may be indicated on the image(s) of the environment. In doing so, the image(s) may be augmented with the first portion 118 and/or the second portion 120 for illustrating the delivery route 116.

At 1010, the process 1000 may include causing second image data to be displayed based at least in part on the arriving at an address associated with the first delivery location. For example, upon arriving at an address of the first delivery location, or completing the first portion 118 of the first delivery route, the delivery device 104 may display image(s) of the first delivery location. Additionally, or alternatively, the delivery device 104 may receive an indication associated with arriving or stopping at the first delivery location, such as an user pressing the parked icon 310. In some instances, the image(s) of the first delivery location may be received from the remote system 100 at 1002. Moreover, the image(s) may be augmented with the second portion 120 of the first delivery route for indicating to the delivery personnel 106 where to walk on the property for delivering to the first delivery location.

At 1012, the process 1000 may include receiving second data associated with the first delivery being completed. For example, the delivery device 104 may receive an indication associated with making the first delivery (e.g., scan, button, press, etc.). In some instances, the delivery device 104 may send data associated with the first delivery to the remote system 100 for optimizing the delivery route(s) 116 to the first delivery location. The data may also be used to update image(s) associated with the delivery location 122, or image(s) that are used when traveling along delivery route(s) 116.

At 1014, the process 1000 may include determining a second delivery associated with the delivery schedule. For example, the delivery device 104 may determine that a second delivery is to a second address, which may correspond to a household, place of business, apartment complex, and so forth. In some instances, the second delivery may be identified a subsequent delivery that is after the first delivery, and which is presented on the display 114 after a completion of the first delivery.

At 1016, the process 1000 may include displaying a second delivery route associated with the second delivery. For example, the delivery device 104 may present, on the display 114, the second delivery route. In some instances, the second delivery route may be presented together, or in conjunction, with a map of an environment through which the delivery personnel 106 travels during the second delivery.

At 1018, the process 1000 may include causing third image data to be display based at least in part on being within a second threshold of a second delivery location associated with the second delivery. For example, as the delivery personnel 106 approaches the second delivery location, the delivery device 104 may display image(s) of the environment, along the first portion 118 of the delivery route 116. In some instances, the image(s) of the delivery route 116 along the first portion 118 may be received from the remote system 100 at 1002. These image(s) may be displayed along with portions of the delivery route 116, such as the first portion 118.

At 1020, the process 1000 may include causing fourth image data to be displayed based at least in part on the arriving at an address associated with the second delivery location. For example, upon arriving at the address associated with the second delivery location, completing the first portion 118 of the second delivery route, or receiving an indication associated with arriving or stopping at the address of the second delivery location, the delivery device 104 may display image(s) of the second delivery location, Moreover, the image(s) may be augmented with the second portion 120 of the second delivery route indicating to the delivery personnel 106 where to walk on the property for delivering to the second delivery location.

At 1022, the process 1000 may include receiving third data associated with the second delivery being completed. For example, the delivery device 104 may receive an indication associated with making the second delivery (e.g., scan, button, press, etc.). In some instances, the delivery device 104 may send data associated with the second delivery to the remote system 100 for optimizing the delivery route(s) 116 to the second delivery location.

FIG. 11 illustrates an example process 1100 for augmenting delivery routes 116 based on image captured by a plurality of device(s).

At 1102, the process 1100 may include receiving, at first device, data associated with a delivery. For example, the delivery device 104 may receive, from the remote system 100, an indication for making the delivery. In some instances, the data may include identifying information of the delivery (e.g., address, recipient, sender, etc.). Additionally, as illustrated, in some instances, the data may include the delivery route 116, first image(s) of the environment along the delivery route 116, and/or second image(s) of the delivery location 122 associated with the delivery.

At 1104, the process 1100 may include causing, at the first device, display of a first portion of the delivery route associated with the delivery. For example, the delivery device 104 may present, on the display 114, the first portion 118 of the delivery route for making the delivery. The first portion 118 of the delivery route may be presented on (e.g., superimposed) a map of the environment in which the delivery is to be made.

At 1106, the process 1100 may include determining that the first device is within a threshold distance of a delivery location associated with the delivery. For example, the delivery device 104 may determine when the delivery device 104 comes within the threshold 222 of the delivery location 122. In some instances, the location component 240 of the delivery device 104 may indicate a current location of the delivery device 104 and compare this location to that associated with the threshold 222.

At 1108, the process 1100 may include causing display of the first image(s) that represent the environment of the delivery route along the first portion. The first image(s) may be previously captured by a second device, such as the vehicle camera 130, during previous deliveries to the delivery location 122 and/or delivery locations proximal to the delivery location 122. In some instances, the environment may represent an environment of the delivery vehicle 102, along the delivery route 116 and during the first portion 118. As such, the image(s) may depict roadways, other cars, buildings, etc. Additionally, as part of displaying the first image(s), the process 1100 may display at least part of the first portion 118 of the delivery route 116. For example, the delivery device 104 may present, on the display 114, the first image(s) representing the environment together with at least part of the first portion 118. For example, the first image(s) of the environment may be augmented with the driving portion of the delivery route 116.

At 1110, the process 1100 may include receiving, at the first device, a second indication associated with arriving at an address associated with the delivery location. For example, the delivery device 104 may receive an indication associated with the delivery vehicle 102 parking or stopping at an address associated with the delivery location 122. In some instances, the delivery device 104 may receive an indication that the first portion 118 of the delivery route 116 was completed.

At 1112, the process 1100 may include causing, at the first device, display of the second image(s) and part of a second portion of the delivery route associated with the delivery. For example, the delivery device 104 may present, on the display 114 the second portion 120 of the delivery route 116 associated with walking to the delivery location 122. In some instances, the second portion 120 may be represented with a different line style, weight, or color as the first portion 118. The second image(s) may be previously captured by a third device, such as the wearable camera 132, during previous deliveries to the delivery location 122. The second image(s) of the delivery location 122 may include walkways, buildings, vegetation, or other structures at a location of the delivery location 122. As such, the delivery device 104 may display, together with the second image(s), at least part of the delivery route 116. The presentation of the second image(s) and the second portion 120 may augment the environment of the delivery personnel 106 for indicating where to make the delivery.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:
1. A device comprising:
a display;
one or more processors; and
one or more non-transitory computer-readable media storing computer-executable instructions that, when executed by the one or more processors, cause the one or more processors to perform operations comprising:
receiving data associated with a route for delivering a parcel to an address, the route including:
a first portion in which a delivery personnel associated with the device drives a vehicle for delivering the parcel, and
a second portion in which the delivery personnel walks from the vehicle to the address to deliver the parcel;
receiving first image data representing an environment along the first portion;
receiving second image data representing a delivery location at the address;
determining, during delivery of the parcel to the address, that the device is within a threshold distance of the address;
displaying, on the display and based on the device being within the threshold distance:
at least part of the first portion,
at least part of the second portion, and
the first image data, the at least part of the first portion and the at least part of the second portion being superimposed on the first image data;
receiving an indication associated with stopping at the address; and displaying, on the display and based on receiving the indication, the second image data and the second portion, the second portion being superimposed on the second image data.

2. The device of claim 1, wherein:
the first portion is displayed in association with at least one of:
   a first line color,
   a first line weight, or
   a first line style; and
the second portion is displayed in association with at least one of:
   a second line color that is different than the first line color,
   a second line weight that is different than the first line weight, or
   a second line style that is different than the first line style.

3. The device of claim 1, the operations further comprising:
receiving a second indication associated with the delivery personnel delivering the parcel; and
   based at least in part on receiving the second indication, at least one of:
      sending a time associated with delivering the parcel;
      sending second data associated with a third portion of the route walked by the delivery personnel to deliver the parcel; or
      displaying, on the display, a second route for delivering a second parcel to a second address.

4. A method comprising:
receiving data associated with a delivery to a delivery location;
causing display of a first portion of a route associated with the delivery and a map of an environment along the route;
determining that a device associated with the delivery is within a threshold of the delivery location;
causing, based at least in part on the device being within the threshold of the delivery location, display of first image data representing the environment and part of the first portion;
receiving an indication associated with completing the first portion; and
causing, based at least in part on receiving the indication, display of second image data representing the delivery location in conjunction with a second portion of the route.

5. The method of claim 4, wherein:
the part of the first portion is superimposed on the first image data; and
the second portion is superimposed on the second image data.

6. The method of claim 4, wherein:
the data is received from a second device that is remote from the device; and
the data comprises at least one of:
   the first portion;
   the second portion;
   the first image data; or
   the second image data.

7. The method of claim 4, wherein the data comprises a delivery instruction associated with the delivery, the method further comprising causing display of the delivery instruction during display of at least one of:
   the first image data and the part of the first portion, or
   the second image data and the second portion.

8. The method of claim 4, further comprising:
determining a first location associated with completing the first portion;
determining a second location associated with the delivery location; and
determining the second portion based at least in part on the first location and the second location.

9. The method of claim 4, wherein:
the first portion is displayed with a first representation that includes at least one of:
   a first line color,
   a first line weight, or
   a first line style; and
the second portion is displayed with a second representation that includes at least one of:
   a second line color that is different than the first line color,
   a second line weight that is different than the first line weight, or
   a second line style that is different than the first line style.

10. The method of claim 4, further comprising:
sending second data associated with at least one of a location or a bearing of the device along the route; and
receiving the first image data, wherein the first image data is determined based at least in part on the at least one of the location or the bearing.

11. The method of claim 4, wherein:
the display includes a first display area and a second display area;
the first portion and the map are displayed in the first display area; and
the first image data and part of the first portion are displayed in the second display area, while the first portion and the map are displayed in the first display area.

12. The method of claim 4, wherein:
the first portion is displayed with a first representation;
the second portion is displayed with a second representation that is different than the first representation;
the first representation is displayed on (i) the map of the environment and (ii) the first image data; and
the second representation is displayed on the second image data.

13. The method of claim 4, further comprising:
receiving third image data representing the environment;
determining at least one of a location or a bearing of the device along the first portion of the route; and
based at least in part on the at least one of the location or the bearing, determining to display the first image data rather than the third image data.

14. A device comprising:
a display;
one or more processors; and
one or more non-transitory computer-readable media storing computer-executable instructions that, when executed by the one or more processors, cause the one or more processors to perform operations comprising:
   receiving data associated with a delivery to a delivery location;
   causing, on the display, presentation of a first portion of a route associated with the delivery and first image data of an environment along the first portion;
   determining that the first portion has been completed; and
   causing, on the display, presentation of a second portion of the route along with second image data representing the delivery location, the second portion of the route being indicated on the second image data.

15. The device of claim 14, the operations further comprising receiving an indication associated with the device being within a threshold distance of the delivery location, and
wherein causing display of the first portion and the first image data is based at least in part on receiving the indication.

16. The device of claim 14, the operations further comprising:
determining at least one of a location or a bearing of the device; and
at least one of:
sending second data associated with the at least one of the location or the bearing; or
determining the first image data based at least in part on the location or the bearing.

17. The device of claim 14, wherein:
the first portion is associated with a first mode of travel by a delivery personnel associated with the delivery, the first portion being represented by at least one of:
a first line color,
a first line weight, or
a first line style; and
the second portion is associated with a second mode of travel by the delivery personnel that is different than the first mode of travel, the second portion being represented by at least one of:
a second line color that is different than the first line color,
a second line weight that is different than the first line weight, or
a second line style that is different than the first line style.

18. The device of claim 14, the operations further comprising:
receiving a first indication associated with the first portion being completed;
receiving a second indication associated with the delivery being completed; and
causing, on the display and based at least in part on receiving the second indication, presentation of a second route associated with a second delivery,
wherein causing presentation of the second portion is based at least in part on receiving the first indication.

19. The device of claim 14, the operations further comprising:
receiving an indication associated with the delivery being completed; and
determining at least one of:
a time associated with the delivery being completed;
a path along which the device travels during the second portion; or
sending, to a second device, second data associated with the time and the path.

20. The device of claim 14, wherein the device includes a camera, the operations further comprising:
generating, via the camera, the first image data; and
determining an orientation of the device,
wherein causing presentation of the first portion is based at least in part on the orientation.

* * * * *